US010882988B2

United States Patent
Nishimura et al.

(10) Patent No.: US 10,882,988 B2
(45) Date of Patent: Jan. 5, 2021

(54) VINYL CHLORIDE RESIN COMPOSITION, VINYL CHLORIDE RESIN MOLDED PRODUCT, AND LAMINATE

(71) Applicant: ZEON CORPORATION, Tokyo (JP)

(72) Inventors: Shota Nishimura, Tokyo (JP); Mitsunori Abe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/481,189

(22) PCT Filed: Feb. 5, 2018

(86) PCT No.: PCT/JP2018/003855
§ 371 (c)(1),
(2) Date: Jul. 26, 2019

(87) PCT Pub. No.: WO2018/143462
PCT Pub. Date: Aug. 9, 2018

(65) Prior Publication Data
US 2019/0390048 A1 Dec. 26, 2019

(30) Foreign Application Priority Data

Feb. 6, 2017 (JP) ................ 2017-019781
Oct. 26, 2017 (JP) ................ 2017-207351

(51) Int. Cl.
C08L 27/06 (2006.01)
B32B 27/06 (2006.01)
B32B 27/22 (2006.01)
B32B 27/30 (2006.01)
C08J 9/36 (2006.01)

(52) U.S. Cl.
CPC ............ *C08L 27/06* (2013.01); *B32B 27/065* (2013.01); *B32B 27/22* (2013.01); *B32B 27/304* (2013.01); *C08J 9/365* (2013.01); B32B 2266/0278 (2013.01); B32B 2605/003 (2013.01); C08J 2375/04 (2013.01); C08J 2427/06 (2013.01); C08L 2205/06 (2013.01); C08L 2207/322 (2013.01)

(58) Field of Classification Search
CPC ....... B32B 27/065; B32B 5/18; B32B 27/304; C08J 9/365; C08J 5/00
See application file for complete search history.

(56) References Cited

U.S. PATENT DOCUMENTS 3,269,943 A 8/1966 Armstrong et al.
4,072,790 A 2/1978 Creekmore et al.
10,533,087 B2 * 1/2020 Iwabuchi ............... B60K 37/00
2005/0282095 A1 * 12/2005 Morita ............... G03C 1/49863
430/619
2017/0342256 A1 11/2017 Iwabuchi

FOREIGN PATENT DOCUMENTS

| JP | S58162650 A | 9/1983 |
| JP | S59155450 A | 9/1984 |
| JP | S60155237 A | 8/1985 |
| JP | S6438462 A | 2/1989 |
| JP | 01156357 A * | 6/1989 |
| JP | H02219845 A | 9/1990 |
| JP | H03181539 A | 8/1991 |
| JP | H03281555 A | 12/1991 |
| JP | H06143513 A | 5/1994 |
| JP | 08291243 A * | 11/1996 |
| JP | H08291243 A | 11/1996 |
| JP | 2000026684 A | 1/2000 |
| WO | 2016075902 A1 | 5/2016 |
| WO | 2016098344 A1 | 6/2016 |

OTHER PUBLICATIONS

Translation of JP 2000-026684, Arimoto et al., Jan. 25, 2000. (Year: 2000).*
Translation of JP H08-291243, Matsuda et al., Nov. 5, 1996. (Year: 1996).*
Translation of JP 01-156357, Kakefuda et al., Jun. 19, 1989. (Year: 1989).*
Aug. 6, 2019, International Preliminary Report on Patentability issued in the International Patent Application No. PCT/JP2018/003855.
May 1, 2018, International Search Report issued in the International Patent Application No. PCT/JP2018/003855.
Aug. 28, 2020, the Extended European Search Report issued by the European Patent Office in the corresponding European Patent Application No. 18747635.3.

* cited by examiner

Primary Examiner — Hai Vo
(74) Attorney, Agent, or Firm — Kenja IP Law PC

(57) ABSTRACT

Provided is a vinyl chloride resin composition that enables production of a vinyl chloride resin molded product that can have a balance of excellent surface lubricity and excellent blooming resistance under normal temperature (23° C.) conditions. The vinyl chloride resin composition contains a vinyl chloride resin (a), a plasticizer (b), and a compound (c) indicated by the following formula (1): $R^1(NR^2COR^3)_n$. In formula (1), n is an integer of not less than 2 and not more than 6, $R^1$ and $R^3$ are each a hydrocarbon group, $R^2$ is a hydrocarbon group or hydrogen, and at least one of the n-number of $R^3$ groups is an unsaturated hydrocarbon group including at least one carbon-carbon unsaturated bond.

8 Claims, No Drawings

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

Vinyl chloride resins are used in a variety of applications due to generally having excellent characteristics in terms of cold resistance, heat resistance, oil resistance, and so forth.

Specifically, automobile interior materials such as a surface skin formed by a vinyl chloride resin molded product and a laminate obtained by lining a surface skin formed by a vinyl chloride resin molded product with a foamed product such as foamed polyurethane are used in the formation of automobile interior components such as automobile instrument panels and door trims.

There is demand for a vinyl chloride resin molded product forming a surface skin of an automobile interior component such as an automobile instrument panel to enable pleasant in-vehicle use and have an aesthetically pleasing design. From these viewpoints, a vinyl chloride resin molded product is required to display performance in terms of various aspects such as surface stickiness of the molded product being favorably suppressed (i.e., having high surface lubricity and high fluff adhesion resistance), external appearance of the molded product not changing over time due to precipitation of a component contained therein (i.e., having high blooming resistance), and so forth.

Note that "fluff adhesion" refers to the adhesion of fibrous waste when a surface is wiped using a cloth.

For example, PTL 1 discloses a vinyl chloride-based resin composition for powder molding containing a vinyl chloride resin, a fatty acid amide, an organopolysiloxane, and a plasticizer. In PTL 1, the coefficient of kinetic friction of a vinyl chloride resin sheet formed using the vinyl chloride-based resin composition for powder molding is reduced and surface lubricity of the vinyl chloride resin sheet is increased by using a primary amide of a saturated fatty acid, such as lauramide, as the fatty acid amide.

CITATION LIST

Patent Literature

PTL 1: JP H8-291243 A

SUMMARY

Technical Problem

However, there is room for further improvement of conventional vinyl chloride resin sheets described in PTL 1 and the like in terms of achieving a balance of high sheet surface lubricity and high blooming resistance under normal temperature (23° C.) conditions.

Accordingly, an objective of the present disclosure is to provide a vinyl chloride resin composition that enables production of a vinyl chloride resin molded product that can have a balance of excellent surface lubricity and excellent blooming resistance under normal temperature (23° C.) conditions.

Another objective of the present disclosure is to provide a vinyl chloride resin molded product and a laminate that can have a balance of excellent surface lubricity and excellent blooming resistance under normal temperature (23° C.) conditions.

Solution to Problem

The inventors conducted diligent investigation with the aim of solving the problems set forth above. Through this investigation, the inventors discovered that by using a vinyl chloride resin composition containing a vinyl chloride resin, a plasticizer, and a compound having a specific structure, it is possible to obtain a vinyl chloride resin molded product having excellent surface lubricity and in which blooming under normal temperature (23° C.) conditions is favorably inhibited. In this manner, the inventors completed the present disclosure.

Specifically, the present disclosure aims to advantageously solve the problems set forth above by disclosing a vinyl chloride resin composition comprising: a vinyl chloride resin (a); a plasticizer (b); and a compound (c) indicated by formula (1), shown below, $$R^1(NR^2COR^3)_n \quad (1)$$

where, in formula (1), n is an integer of not less than 2 and not more than 6, $R^1$ and $R^3$ are each a hydrocarbon group, $R^2$ is a hydrocarbon group or hydrogen, the n-number of $R^2$ groups may be the same as or different from one another, the n-number of $R^3$ groups may be the same as or different from one another, and at least one of the n-number of $R^3$ groups is an unsaturated hydrocarbon group including at least one carbon-carbon unsaturated bond. When a vinyl chloride resin composition contains a vinyl chloride resin (a), a plasticizer (b), and a compound (c) indicated by the specific structure set forth above (hereinafter, also referred to simply as "compound (c)") in this manner, a vinyl chloride resin molded product obtained through molding of the composition can have a balance of excellent surface lubricity and excellent blooming resistance under normal temperature (23° C.) conditions.

In the presently disclosed vinyl chloride resin composition, preferably has a carbon number of not less than 1 and not more than 8. This is because a vinyl chloride resin molded product obtained through molding of the vinyl chloride resin composition can have a better balance of surface lubricity and blooming resistance under normal temperature (23° C.) conditions when the carbon number of $R^1$ is within the specific range set forth above.

In the presently disclosed vinyl chloride resin composition, each of the n-number of $R^3$ groups is preferably an unsaturated hydrocarbon group including at least one carbon-carbon unsaturated bond. This is because a vinyl chloride resin molded product obtained through molding of the vinyl chloride resin composition can have a better balance of surface lubricity and blooming resistance under normal temperature (23° C.) conditions when each of the n-number of $R^3$ groups is an unsaturated hydrocarbon group including at least one carbon-carbon unsaturated bond.

In the presently disclosed vinyl chloride resin composition, the number of carbon-carbon unsaturated bonds included in the unsaturated hydrocarbon group of $R^3$ is preferably not less than 1 and not more than 4. This is because a vinyl chloride resin molded product obtained through molding of the vinyl chloride resin composition can have an even better balance of surface lubricity and blooming resistance under normal temperature (23° C.) conditions when the number of carbon-carbon unsaturated bonds included in the unsaturated hydrocarbon group of $R^3$ is within the specific range set forth above.

In the presently disclosed vinyl chloride resin composition, each of the n-number of $R^3$ groups preferably has a carbon number of not less than 11 and not more than 23. This is because a vinyl chloride resin molded product obtained through molding of the vinyl chloride resin composition can have an even better balance of surface lubricity and blooming resistance under normal temperature (23° C.) conditions when the carbon number of $R^3$ is within the specific range set forth above.

In the presently disclosed vinyl chloride resin composition, content of the compound (c) is preferably not less than 0.04 parts by mass and not more than 2.0 parts by mass per 100 parts by mass of the vinyl chloride resin (a). This is because a vinyl chloride resin molded product obtained through molding of the vinyl chloride resin composition can have a balance of higher levels of surface lubricity and blooming resistance under normal temperature (23° C.) conditions when the content of the compound (c) is within the specific range set forth above.

In the presently disclosed vinyl chloride resin composition, $R^2$ is preferably hydrogen. This is because a vinyl chloride resin molded product obtained through molding of the vinyl chloride resin composition can have an even better balance of surface lubricity and blooming resistance under normal temperature (23° C.) conditions when $R^2$ is hydrogen.

The presently disclosed vinyl chloride resin composition preferably further comprises an amide compound (d) having a higher melting point than the compound (c). This is because a vinyl chloride resin molded product obtained through molding of the vinyl chloride resin composition can have a balance of excellent surface lubricity and excellent blooming resistance under high temperature conditions when the vinyl chloride resin composition further contains the specific amide compound (d) set forth above (hereinafter, also referred to simply as "amide compound (d)").

In the presently disclosed vinyl chloride resin composition, the amide compound (d) is preferably a compound indicated by formula (2), shown below,

$$R^4(NR^5COR^6)_n \quad (2)$$

where, in formula (2), n is an integer of not less than 2 and not more than 6, $R^4$ and $R^6$ are each, independently of one another, a hydrocarbon group, $R^5$ is a hydrocarbon group or hydrogen, the n-number of $R^5$ groups may be the same as or different from one another, and the n-number of $R^6$ groups may be the same as or different from one another. This is because a vinyl chloride resin molded product obtained through molding of the vinyl chloride resin composition can have a better balance of surface lubricity and blooming resistance under high temperature conditions when the amide compound (d) is a compound indicated by the specific structure set forth above.

In the presently disclosed vinyl chloride resin composition, $R^6$ is preferably a saturated hydrocarbon group. This is because blooming resistance under high temperature conditions of a vinyl chloride resin molded product obtained through molding of the vinyl chloride resin composition can be further increased when $R^6$ is a saturated hydrocarbon group.

In the presently disclosed vinyl chloride resin composition, a mixture of the compound (c) and the amide compound (d) preferably has a single melting point. This is because blooming resistance under high temperature conditions of a vinyl chloride resin molded product obtained through molding of the vinyl chloride resin composition can be further increased when a mixture of the compound (c) and the amide compound (d) has a single melting point.

Note that when a mixture of the compound (c) and the amide compound (d) is said to "have a single melting point" in the present disclosure, this means that in differential scanning calorimetry (DSC) of a mixture obtained by mixing the compound (c) and the amide compound (d) in the same ratio as these compounds are present in the vinyl chloride resin composition, a single main peak for heat absorption is observed during heating.

In the presently disclosed vinyl chloride resin composition, the single melting point is preferably not lower than 120° C. and not higher than 142° C. This is because blooming resistance under high temperature conditions of a vinyl chloride resin molded product obtained through molding of the vinyl chloride resin composition can be even further increased when the single melting point is within the range of values set forth above.

In the presently disclosed vinyl chloride resin composition, content of the amide compound (d) is preferably not less than 0.2 times and not more than 5 times content of the compound (c). This is because blooming resistance under high temperature conditions of a vinyl chloride resin molded product obtained through molding of the vinyl chloride resin composition can be even further increased when the content of the amide compound (d) is 0.2 or more times the content of the compound (c). Moreover, surface lubricity of a vinyl chloride resin molded product obtained through molding of the vinyl chloride resin composition can be even further increased when the content of the amide compound (d) is 5 or less times the content of the compound (c).

The presently disclosed vinyl chloride resin composition is preferably used in powder molding. This is because a vinyl chloride resin molded product that can favorably be used as an automobile interior material such as a surface skin for an automobile instrument panel, for example, can easily be obtained by using the vinyl chloride resin composition in powder molding.

Moreover, the presently disclosed vinyl chloride resin composition is preferably used in powder slush molding. This is because a vinyl chloride resin molded product that can favorably be used as an automobile interior material such as a surface skin for an automobile instrument panel, for example, can more easily be obtained by using the vinyl chloride resin composition in powder slush molding.

The present disclosure also aims to advantageously solve the problems set forth above by disclosing a vinyl chloride resin molded product obtained through molding of any one of the vinyl chloride resin compositions set forth above. By obtaining the vinyl chloride resin molded product using the vinyl chloride resin composition set forth above, it is possible to achieve a balance of excellent surface lubricity and excellent blooming resistance under normal temperature (23° C.) conditions.

The presently disclosed vinyl chloride resin molded product is preferably for a surface skin of an automobile interior component. This is because an automobile interior component (for example, an automobile instrument panel) having high surface lubricity, favorably suppressed fluff adhesion, and low tendency for blooming to occur can be produced when the vinyl chloride resin molded product is used as a surface skin of the automobile interior component.

The present disclosure also aims to advantageously solve the problems set forth above by disclosing a laminate comprising: a foamed polyurethane molded product; and any one of the vinyl chloride resin molded products set forth above. The laminate including the foamed polyurethane molded product and the vinyl chloride resin molded product set forth above can, for example, suitably be used as an automobile interior material used in production of an automobile interior component (for example, an automobile instrument panel) having a balance of excellent surface lubricity and excellent blooming resistance under normal temperature (23° C.) conditions.

Advantageous Effect

According to the present disclosure, a vinyl chloride resin composition that enables production of a vinyl chloride resin molded product that can have a balance of excellent surface lubricity and excellent blooming resistance under normal temperature (23° C.) conditions is obtained.

Moreover, according to the present disclosure, a vinyl chloride resin molded product and a laminate that can have a balance of excellent surface lubricity and excellent blooming resistance under normal temperature (23° C.) conditions are obtained.

DETAILED DESCRIPTION

The following provides a detailed description of embodiments of the present disclosure.

The presently disclosed vinyl chloride resin composition can be used, for example, in formation of the presently disclosed vinyl chloride resin molded product. Moreover, a vinyl chloride resin molded product formed using the presently disclosed vinyl chloride resin composition can suitably be used, for example, as an automobile interior material such as a surface skin included in an automobile interior component such as an automobile instrument panel or a door trim.

The presently disclosed vinyl chloride resin molded product can be used, for example, in formation of the presently disclosed laminate. Moreover, a laminate formed using the presently disclosed vinyl chloride resin molded product can suitably be used, for example, as an automobile interior material used in production of an automobile interior component such as an automobile instrument panel or a door trim.

(Vinyl Chloride Resin Composition)

The presently disclosed vinyl chloride resin composition contains a vinyl chloride resin (a), a plasticizer (b), and a compound (c) having a specific structure, and may optionally further contain a specific amide compound (d) and/or additives. As a result of the presently disclosed vinyl chloride resin composition containing at least the vinyl chloride resin (a), the plasticizer (b), and the compound (c), the composition can be used to form a vinyl chloride resin molded product having a balance of excellent surface lubricity and excellent blooming resistance under normal temperature (23° C.) conditions. Moreover, as a result of the presently disclosed vinyl chloride resin composition containing at least the vinyl chloride resin (a), the plasticizer (b), and the compound (c), a vinyl chloride resin molded product obtained through molding of the composition can display excellent fluff adhesion resistance. Therefore, by using the presently disclosed vinyl chloride resin composition, it is possible to obtain a vinyl chloride resin molded product that is suitable as an automobile interior material (for example, a surface skin for an automobile instrument panel or door trim) having excellent surface lubricity, blooming resistance under normal temperature (23° C.) conditions, and fluff adhesion resistance, for example.

Note that from a viewpoint of easily obtaining a vinyl chloride resin molded product that can favorably be used as an automobile interior material using the presently disclosed vinyl chloride resin composition, for example, the presently disclosed vinyl chloride resin composition is preferably used in powder molding, and is more preferably used in powder slush molding.

<Vinyl Chloride Resin (a)>

The vinyl chloride resin composition may, for example, contain one type or two or more types of vinyl chloride resin particles as the vinyl chloride resin (a), and may optionally further contain one type or two or more types of vinyl chloride resin fine particles as the vinyl chloride resin (a). In particular, the vinyl chloride resin (a) preferably includes at least vinyl chloride resin particles, and more preferably includes vinyl chloride resin particles and vinyl chloride resin fine particles.

The vinyl chloride resin (a) may be produced by any production method known in the art such as suspension polymerization, emulsion polymerization, solution polymerization, or bulk polymerization.

The present description uses the term "resin particles" to refer to particles with a particle diameter of 30 μm or more, and the term "resin fine particles" to refer to particles with a particle diameter of less than 30 μm.

Examples of the vinyl chloride resin (a) include homopolymers composed of vinyl chloride monomer units and also vinyl chloride-based copolymers preferably comprising 50 mass % or more of vinyl chloride monomer units, and more preferably 70 mass % or more of vinyl chloride monomer units. Specific examples of monomers (comonomers) that are copolymerizable with vinyl chloride monomer and may be used to form a vinyl chloride-based copolymer include those described in WO 2016/098344 A1, for example. One of these components may be used individually, or two or more of these components may be used in combination in a freely selected ratio.

<<Vinyl Chloride Resin Particles>>

In the vinyl chloride resin composition, the vinyl chloride resin particles normally function as a matrix resin (base material). The vinyl chloride resin particles are preferably produced by suspension polymerization.

[Average Degree of Polymerization]

The average degree of polymerization of a vinyl chloride resin forming the vinyl chloride resin particles is preferably 1,000 or more, and is preferably 3,000 or less. When the average degree of polymerization of the vinyl chloride resin forming the vinyl chloride resin particles is not less than the lower limit set forth above, sufficient physical strength of a vinyl chloride resin molded product formed using the vinyl chloride resin composition can be ensured while also improving tensile characteristics (particularly tensile elongation), for example. A vinyl chloride resin molded product having good tensile elongation can suitably be used as an automobile interior material (for example, a surface skin of an automobile instrument panel) that has excellent ductility and that ruptures as designed without scattering of fragments when an airbag expands and is deployed, for example. Moreover, when the average degree of polymerization of the vinyl chloride resin forming the vinyl chloride resin particles is not more than the upper limit set forth above, meltability of the vinyl chloride resin composition can be improved.

The "average degree of polymerization" referred to in the present disclosure can be measured in accordance with JIS K6720-2.

[Average Particle Diameter]

The average particle diameter of the vinyl chloride resin particles is normally 30 μm or more, preferably 50 μm or more, and more preferably 100 μm or more, and is preferably 500 μm or less, and more preferably 200 μm or less. This is because powder fluidity of the vinyl chloride resin composition can be further improved when the average particle diameter of the vinyl chloride resin particles is not less than any of the lower limits set forth above. Moreover, meltability of the vinyl chloride resin composition further improves and surface smoothness of a vinyl chloride resin molded product formed using the composition can be further improved when the average particle diameter of the vinyl chloride resin particles is not more than any of the upper limits set forth above.

The "average particle diameter" referred to in the present disclosure can be measured as the volume-average particle diameter by laser diffraction in accordance with JIS Z8825.

[Percentage Content]

The percentage content of the vinyl chloride resin particles among the vinyl chloride resin (a) is preferably 70 mass % or more, and more preferably 80 mass % or more, may be 100 mass %, and is preferably 95 mass % or less, and more preferably 90 mass % or less. When the percentage content of the vinyl chloride resin particles among the vinyl chloride resin (a) is not less than any of the lower limits set forth above, sufficient physical strength of a vinyl chloride resin molded product formed using the vinyl chloride resin composition can be ensured while also improving tensile elongation. Moreover, when the percentage content of the vinyl chloride resin particles among the vinyl chloride resin (a) is not more than any of the upper limits set forth above, powder fluidity of the vinyl chloride resin composition improves.

<<Vinyl Chloride Resin Fine Particles>>

In the vinyl chloride resin composition, the vinyl chloride resin fine particles normally function as a dusting agent (powder fluidity modifier). The vinyl chloride resin fine particles are preferably produced by emulsion polymerization.

[Average Degree of Polymerization]

The average degree of polymerization of a vinyl chloride resin forming the vinyl chloride resin fine particles is preferably 500 or more, and more preferably 700 or more, and is preferably 1,000 or less, and more preferably 900 or less. When the average degree of polymerization of the vinyl chloride resin forming the vinyl chloride resin fine particles used as a dusting agent is not less than any of the lower limits set forth above, powder fluidity of the vinyl chloride resin composition improves, and tensile elongation of a molded product obtained using the composition improves. Moreover, when the average degree of polymerization of the vinyl chloride resin forming the vinyl chloride resin fine particles is not more than any of the upper limits set forth above, meltability of the vinyl chloride resin composition further improves, and surface smoothness of a vinyl chloride resin molded product formed using the composition further improves.

[Average Particle Diameter]

The average particle diameter of the vinyl chloride resin fine particles is normally less than 30 μm, preferably 10 μm or less, and more preferably 5 μm or less, and is preferably 0.1 μm or more, and more preferably 1 μm or more. When the average particle diameter of the vinyl chloride resin fine particles is not less than any of the lower limits set forth above, the vinyl chloride resin fine particles are not too small to function as a dusting agent, for example, and the vinyl chloride resin composition can display even better powder fluidity. Moreover, when the average particle diameter of the vinyl chloride resin fine particles is not more than any of the upper limits set forth above, meltability of the vinyl chloride resin composition increases, and surface smoothness of a vinyl chloride molded product formed therewith can be further improved.

[Percentage Content]

The percentage content of the vinyl chloride resin fine particles among the vinyl chloride resin (a) may be 0 mass %, but is preferably 5 mass % or more, and more preferably 10 mass % or more, and is preferably 30 mass % or less, and more preferably 20 mass % or less. This is because powder fluidity of the vinyl chloride resin composition further improves when the percentage content of the vinyl chloride resin fine particles among the vinyl chloride resin (a) is not less than any of the lower limits set forth above. Moreover, physical strength of a vinyl chloride resin molded product formed using the vinyl chloride resin composition can be further increased when the percentage content of the vinyl chloride resin fine particles among the vinyl chloride resin (a) is not more than any of the upper limits set forth above.

<Plasticizer (b)>

Any of the primary plasticizers, secondary plasticizers, or the like described in WO 2016/098344 A1, for example, may be used as the plasticizer (b). One of these components may be used individually, or two or more of these components may be used in combination in a freely selected ratio.

Of these plasticizers, it is preferable to use at least a primary plasticizer and more preferable to use both a primary plasticizer and a secondary plasticizer as the plasticizer (b) from a viewpoint of making it easy to favorably obtain a vinyl chloride resin composition and a vinyl chloride resin molded product. Specifically, it is preferable that a trimellitic acid ester and/or pyromellitic acid ester is used as the plasticizer (b), more preferable that at least a trimellitic acid ester is used as the plasticizer (b), and even more preferable that a trimellitic acid ester and epoxidized soybean oil are used in combination as the plasticizer (b).

Although no specific limitations are placed on the form of the plasticizer (b), the plasticizer (b) is preferably a liquid at normal temperature (23° C.) from a viewpoint of ease of mixing with the vinyl chloride resin (a) and a viewpoint of further inhibiting blooming at the surface of a vinyl chloride resin molded product.

[Content]

The content of the plasticizer (b) per 100 parts by mass of the vinyl chloride resin (a) is preferably 10 parts by mass or more, more preferably 60 parts by mass or more, and even more preferably 80 parts by mass or more, and is preferably 200 parts by mass or less, more preferably 160 parts by mass or less, even more preferably 120 parts by mass or less, and further preferably 100 parts by mass or less. Tensile elongation of a vinyl chloride resin molded product formed using the vinyl chloride resin composition can be sufficiently increased when the content of the plasticizer (b) is not less than any of the lower limits set forth above. Moreover, surface stickiness of a vinyl chloride resin molded product can be further suppressed, and surface lubricity and fluff adhesion resistance of the vinyl chloride resin molded product can be further increased when the content of the plasticizer (b) is not more than any of the upper limits set forth above.

<Compound (c)>

A feature of the specific compound contained in the presently disclosed vinyl chloride resin composition is that the compound is indicated by formula (1), shown below,

$$R^1(NR^2COR^3)_n \qquad (1)$$

where, in formula (1), n is an integer of not less than 2 and not more than 6, $R^1$ is a hydrocarbon group having a valence of n, $R^2$ is a hydrocarbon group having a valence of 1 or hydrogen, $R^3$ is a hydrocarbon group having a valence of 1, the n-number of $R^2$ groups may be the same as or different from one another, the n-number of $R^3$ groups may be the same as or different from one another, and at least one of the n-number of $R^3$ groups is an unsaturated hydrocarbon group including at least one carbon-carbon unsaturated bond. In other words, the compound (c) has a structure in which n-number of hydrogen atoms of a hydrocarbon are replaced by amide groups indicated by —$NR^2COR^3$. If the compound (c) does not have the specific structure set forth above, a vinyl chloride resin molded product formed using the vinyl chloride resin composition cannot have a good balance of surface lubricity and blooming resistance under normal temperature (23° C.) conditions, and sufficiently high fluff adhesion resistance of the vinyl chloride resin molded product cannot be ensured.

The compound (c) normally functions as a lubricant that improves fluidity, mold release properties, and processability of the vinyl chloride resin composition by easing friction between components, and particularly between particulate components, in the composition, and that favorably suppresses stickiness of the surface of a vinyl chloride resin molded product formed using the composition. In general, in a situation in which a lubricant is compounded in a vinyl chloride resin molded product, the lubricant migrates to the surface of the molded product and crystallizes over time, particularly under normal temperature (23° C.) conditions, and thus blooming readily occurs. However, as a result of the compound (c) contained in the presently disclosed vinyl chloride resin composition having the specific structure set forth above, it is surprisingly possible to inhibit blooming at the surface of a vinyl chloride resin molded product formed using the vinyl chloride resin composition while also causing the vinyl chloride resin molded product to display excellent surface lubricity and fluff adhesion resistance.

Moreover, as a result of the presently disclosed vinyl chloride resin composition containing the compound (c), surface lubricity and fluff adhesion resistance of a vinyl chloride resin molded product formed using the composition can be sufficiently increased without further inclusion of other lubricants such as described further below, for example.

<<Structure>>

[n]

In formula (1), n is required to be an integer of not less than 2 and not more than 6, is preferably an integer of not less than 2 and not more than 3, and is more preferably 2. Although the reason for this is not clear, it is not possible to achieve a good balance of surface lubricity and blooming resistance under normal temperature (23° C.) conditions of a vinyl chloride resin molded product formed using the vinyl chloride resin composition, and it is not possible to ensure that the vinyl chloride resin molded product has sufficiently high fluff adhesion resistance if n is not within any of the ranges set forth above.

[$R^1$]

$R^1$ in formula (1) is a hydrocarbon group having a valence of n. Although, $R^1$ may be an aliphatic hydrocarbon group having a valence of n or an aromatic hydrocarbon group having a valence of n, $R^1$ is preferably an aliphatic hydrocarbon group having a valence of n, and more preferably a saturated aliphatic hydrocarbon group having a valence of n.

Moreover, $R^1$ is preferably a chain hydrocarbon group having a valence of n, more preferably a chain aliphatic hydrocarbon group having a valence of n, and even more preferably a saturated chain aliphatic hydrocarbon group having a valence of n.

The carbon number of $R^1$ is preferably 1 or more, and more preferably 2 or more, and is preferably 8 or less, and more preferably 6 or less.

$R^1$ may, for example, be a methylene group, a methylmethylene group, an ethylene group (dimethylene group), a dimethylmethylene group, an isopropylene group, a trimethylene group, an isobutylene group, a tetramethylene group, a hexamethylene group, or the like. Of these examples, $R^1$ is preferably a methylene group, an ethylene group (dimethylene group), or a hexamethylene group.

Although the reason for this is not clear, it is possible to achieve a better balance of surface lubricity and blooming resistance under normal temperature (23° C.) conditions of a vinyl chloride resin molded product formed using the vinyl chloride resin composition, and to ensure that the vinyl chloride resin molded product has sufficiently high fluff adhesion resistance when the structure of $R^1$ is as set forth above.

[$R^2$]

$R^2$ in formula (1) is a hydrocarbon group having a valence of 1 or hydrogen. The n-number of $R^2$ groups may be the same as or different from one another. Each hydrocarbon group having a valence of 1 of $R^2$ may be an aliphatic hydrocarbon group having a valence of 1 or an aromatic hydrocarbon group having a valence of 1, but is preferably an aliphatic hydrocarbon group having a valence of 1, more preferably a chain aliphatic hydrocarbon group having a valence of 1, and even more preferably a saturated chain aliphatic hydrocarbon group having a valence of 1.

The carbon number of each hydrocarbon group of $R^2$ is preferably 1 or 2, and is more preferably 1.

$R^2$ may, for example, be hydrogen, a methyl group, an ethyl group, or the like.

It is preferable that at least one of the n-number of $R^2$ groups is hydrogen, and more preferable that each of the n-number of $R^2$ groups is hydrogen.

This is because it is possible to achieve a better balance of surface lubricity and blooming resistance under normal temperature (23° C.) conditions of a vinyl chloride resin molded product formed using the vinyl chloride resin composition, and to ensure that the vinyl chloride resin molded product has sufficiently high fluff adhesion resistance when the structure of $R^2$ is as set forth above.

[$R^3$]

$R^3$ in formula (1) is a hydrocarbon group having a valence of 1. The n-number of $R^3$ groups may be the same as or different from one another, but it is a requirement that at least one of the n-number of $R^3$ groups is an unsaturated hydrocarbon group including at least one carbon-carbon unsaturated bond. In other words, a saturated hydrocarbon group of $R^3$ and an unsaturated hydrocarbon group of $R^3$ may be present together in a single molecule of the compound (c), or only unsaturated hydrocarbon groups of $R^3$ may be present in a single molecule of the compound (c). Although the reason for this is not clear, it is not possible to achieve a good balance of surface lubricity and blooming resistance under normal temperature (23° C.) conditions of a vinyl chloride resin molded product formed using the vinyl chloride resin composition, and to ensure that the vinyl chloride resin molded product has sufficiently high fluff adhesion resistance if $R^3$ does not have the specific structure set forth above.

Each saturated hydrocarbon group of $R^3$ is preferably a saturated aliphatic hydrocarbon group having a valence of 1, and more preferably a saturated chain aliphatic hydrocarbon group having a valence of 1.

The carbon number of each saturated hydrocarbon group of $R^3$ is preferably 11 or more, more preferably 13 or more, and even more preferably 15 or more, is preferably 23 or less, more preferably 21 or less, and even more preferably 19 or less, and is particularly preferably 17.

Each saturated hydrocarbon group of $R^3$ may, for example, be $CH_3(CH_2)_{10}$—, $CH_3(CH_2)_{12}$—, $CH_3(CH_2)_{14}$—, $CH_3(CH_2)_{16}$—, $CH_3(CH_2)_{18}$—, $CH_3(CH_2)_{20}$—, $CH_3(CH_2)_{22}$—, or the like.

Each unsaturated hydrocarbon group of $R^3$ is preferably an unsaturated aliphatic hydrocarbon group having a valence of 1, and more preferably an unsaturated chain aliphatic hydrocarbon group having a valence of 1. Moreover, each unsaturated hydrocarbon group of $R^3$ is preferably an unsaturated chain hydrocarbon group having a valence of 1.

The carbon number of each unsaturated hydrocarbon group of $R^3$ is preferably 11 or more, more preferably 13 or more, and even more preferably 15 or more, is preferably 23 or less, more preferably 21 or less, and even more preferably 19 or less, and is particularly preferably 17. Although the reason for this is not clear, it is possible to achieve a better balance of surface lubricity and blooming resistance under normal temperature (23° C.) conditions of a vinyl chloride resin molded product formed using the vinyl chloride resin composition, and to ensure that the vinyl chloride resin molded product has sufficiently high fluff adhesion resistance when the structure of $R^3$ is as set forth above.

Each unsaturated hydrocarbon group of $R^3$ may, for example, be an unsaturated hydrocarbon group including one or more carbon-carbon double bonds such as a monounsaturated hydrocarbon group (for example, $CH_3(CH_2)_7CH=CH(CH_2)_7$— or $CH_3(CH_2)_7CH=CH(CH_2)_{11}$—), a diunsaturated hydrocarbon group (for example, $CH_3(CH_2)_4(CH=CHCH_2)_2(CH_2)_6$—), a triunsaturated hydrocarbon group (for example, $CH_3CH_2(CH=CHCH_2)_3(CH_2)_6$—), a tetraunsaturated hydrocarbon group, a pentaunsaturated hydrocarbon group, or a hexaunsaturated hydrocarbon group, or may be an unsaturated hydrocarbon group including one or more carbon-carbon triple bonds. Of these examples, each unsaturated hydrocarbon group of $R^3$ is more preferably an unsaturated hydrocarbon group including one or more carbon-carbon double bonds.

Furthermore, it is preferable that each of the n-number of $R^3$ groups is an unsaturated hydrocarbon group including at least one carbon-carbon unsaturated bond. The number of carbon-carbon unsaturated bonds included in each unsaturated hydrocarbon group of $R^3$ is preferably 1 or more, is preferably 4 or less, more preferably 3 or less, and even more preferably 2 or less, and is particularly preferably 1. Although the reason for this is not clear, it is possible to achieve a better balance of surface lubricity and blooming resistance under normal temperature (23° C.) conditions of a vinyl chloride resin molded product formed using the vinyl chloride resin composition, and to ensure that the vinyl chloride resin molded product has sufficiently high fluff adhesion resistance when the structure of $R^3$ is as set forth above.

Of the examples set forth above, $R^3$ is preferably a monounsaturated hydrocarbon group including a carbon-carbon double bond, and is more preferably $CH_3(CH_2)_7CH=CH(CH_2)_7$—.

When the preferable structures of $R^1$, $R^2$, and $R^3$ set forth above are taken into consideration, the compound (c) is preferably an unsaturated fatty acid amide (secondary amide of an unsaturated fatty acid) including n-number of amide bonds in a single molecule thereof, and is more preferably a long-chain unsaturated fatty acid amide (secondary amide of a long-chain unsaturated fatty acid).

Specifically, the compound (c) may, for example, be ethylene bisoleamide (particularly dimethylene bisoleamide), ethylene biserucamide, hexamethylene bisoleamide, or the like. Of these examples, the compound (c) is preferably ethylene bisoleamide or hexamethylene bisoleamide.

<<Melting Point>>

The melting point of the compound (c) is preferably 20° C. or higher, and more preferably 40° C. or higher, and is preferably 119° C. or lower, and more preferably 117° C. or lower.

In the present disclosure, the term "melting point" refers to a melting point that, in differential scanning calorimetry (DSC) of a target, is observed during a second heating process performed with a heating rate of 10° C./min in air.

<<Content>>

The content of the compound (c) per 100 parts by mass of the previously described vinyl chloride resin (a) is preferably 0.04 parts by mass or more, more preferably 0.1 parts by mass or more, even more preferably 0.12 parts by mass or more, further preferably 0.16 parts by mass or more, and even further preferably 0.2 parts by mass or more, and is preferably 2.0 parts by mass or less, and more preferably 1.0 parts by mass or less. When the content of the compound (c) relative to the vinyl chloride resin (a) is not less than any of the lower limits set forth above, surface lubricity and fluff adhesion resistance of a vinyl chloride resin molded product formed using the vinyl chloride resin composition can be further improved. Moreover, when the content of the compound (c) relative to the vinyl chloride resin (a) is not more than any of the upper limits set forth above, blooming resistance under normal temperature (23° C.) conditions of a vinyl chloride resin molded product formed using the vinyl chloride resin composition can be further improved.

The content of the compound (c) per 100 parts by mass of the previously described plasticizer (b) is preferably 0.04 parts by mass or more, more preferably 0.1 parts by mass or more, even more preferably 0.12 parts by mass or more, further preferably 0.16 parts by mass or more, and even further preferably 0.2 parts by mass or more, and is preferably 2.0 parts by mass or less, and more preferably 1.0 parts by mass or less. In general, the plasticizer (b) tends to become a cause of stickiness of the surface of a vinyl chloride resin molded product, and hence surface lubricity and fluff adhesion resistance of a vinyl chloride resin molded product formed using the vinyl chloride resin composition can be further improved when the content of the compound (c) relative to the plasticizer (b) is not less than any of the lower limits set forth above. Moreover, when the content of the compound (c) relative to the plasticizer (b) is not more than any of the upper limits set forth above, blooming resistance under normal temperature (23° C.) conditions of a vinyl chloride resin molded product formed using the vinyl chloride resin composition can be further improved.

<Amide Compound (d)>

Besides the components set forth above, the presently disclosed vinyl chloride resin composition preferably further contains a specific amide compound (d). When the amide compound (d) has a higher melting point than the compound (c), it is possible to achieve a good balance of surface lubricity and blooming resistance under high temperature conditions of a vinyl chloride resin molded product formed using the vinyl chloride resin composition. The term "high temperature" more specifically refers to a temperature that is equal to or higher than the melting point of the previously described compound (c). In a case in which the presently disclosed vinyl chloride resin composition further contains the amide compound (d), a vinyl chloride resin molded product formed using the vinyl chloride resin composition can display excellent blooming resistance even under conditions of a temperature that is equal to or higher than the melting point of the compound (c).

<<Melting Point>>

More specifically, the melting point of the amide compound (d) is preferably 130° C. or higher, more preferably 135° C. or higher, and even more preferably 140° C. or higher, and is preferably 250° C. or lower, more preferably 200° C. or lower, and even more preferably 160° C. or lower. This is because blooming resistance under high temperature conditions of a vinyl chloride resin molded product obtained through molding of the vinyl chloride resin composition can be further increased when the melting point of the amide compound (d) is not lower than 130° C. and not higher than 250° C.

The difference between the melting point of the amide compound (d) and the melting point of the previously described compound (c) is preferably 15° C. or more, more preferably 20° C. or more, and even more preferably 25° C. or more, and is preferably 40° C. or less, more preferably 35° C. or less, and even more preferably 30° C. or less. This is because blooming resistance under high temperature conditions of a vinyl chloride resin molded product obtained through molding of the vinyl chloride resin composition can be further increased when the difference between the melting point of the amide compound (d) and the melting point of the compound (c) is not less than 15° C. and not more than 40° C.

It is also preferable that a mixture obtained by mixing the compound (c) and the amide compound (d) in the same ratio as these compounds are present in the vinyl chloride resin composition has a single melting point. This is because blooming resistance under high temperature conditions of a vinyl chloride resin molded product obtained through molding of the vinyl chloride resin composition can be further increased when the aforementioned mixture of the previously described compound (c) and the amide compound (d) has a single melting point. The single melting point of the mixture of the previously described compound (c) and the amide compound (d) is preferably 120° C. or higher, more preferably 122° C. or higher, and even more preferably 124° C. or higher, and is preferably 142° C. or lower, more preferably 138° C. or lower, even more preferably 134° C. or lower, and further preferably 128° C. or lower. This is because blooming resistance under high temperature conditions of a vinyl chloride resin molded product obtained through molding of the vinyl chloride resin composition can be further increased when the single melting point of the mixture of the previously described compound (c) and the amide compound (d) is within any of the specific ranges set forth above.

Although it is not clear why blooming resistance under high temperature conditions of a vinyl chloride resin molded product obtained through molding of the vinyl chloride resin composition containing the amide compound (d) can be further increased, the reason is presumed to be that blooming of the compound (c) having a lower melting point than the amide compound (d) can be prevented even under high temperature conditions due to the amide compound (d) interacting with the compound (c), which is an amide group-containing compound.

<<Structure>>

The amide compound (d) is preferably indicated by formula (2), shown below, $$R^4(NR^5COR^6)_n \qquad (2)$$

where, in formula (2), n is an integer of not less than 2 and not more than 6, $R^4$ is a hydrocarbon group having a valence of n, $R^5$ is a hydrocarbon group having a valence of 1 or hydrogen, $R^6$ is a hydrocarbon group having a valence of 1, the n-number of $R^5$ groups may be the same as or different from one another, and the n-number of $R^6$ groups may be the same as or different from one another. In other words, the amide compound (d) preferably has a structure in which n-number of hydrogen atoms of a hydrocarbon are replaced by amide groups indicated by $-NR^5COR^6$. When the amide compound (d) has the specific structure set forth above, it is possible to achieve a better balance of surface lubricity and blooming resistance under high temperature conditions of a vinyl chloride resin molded product formed using the vinyl chloride resin composition.

[n]

In formula (2), n is an integer of not less than 2 and not more than 6, is preferably an integer of not less than 2 and not more than 3, and is more preferably 2. Although the reason for this is not clear, blooming resistance under high temperature conditions of a vinyl chloride resin molded product obtained through molding of the vinyl chloride resin composition can be even further increased when n is within any of the specific ranges set forth above.

[$R^4$]

$R^4$ in formula (2) is a hydrocarbon group having a valence of n. Although $R^4$ may be an aliphatic hydrocarbon group having a valence of n or an aromatic hydrocarbon group having a valence of n, $R^4$ is preferably an aliphatic hydrocarbon group having a valence of n, and more preferably a saturated aliphatic hydrocarbon group having a valence of n. Moreover, $R^4$ is preferably a chain hydrocarbon group having a valence of n, more preferably a chain aliphatic hydrocarbon group having a valence of n, and even more preferably a saturated chain aliphatic hydrocarbon group having a valence of n.

The carbon number of $R^4$ is preferably 1 or more, and more preferably 2 or more, and is preferably 8 or less, and more preferably 6 or less. Note that the carbon number of $R^4$ is preferably the same as the carbon number of $R^1$ in the previously described compound (c).

$R^4$ may, for example, be a methylene group, a methylmethylene group, an ethylene group (dimethylene group), a dimethylmethylene group, an isopropylene group, a trimethylene group, an isobutylene group, a tetramethylene group, a hexamethylene group, or the like. Of these examples, $R^4$ is preferably a methylene group, an ethylene group (dimethylene group), or a hexamethylene group.

Although the reason for this is not clear, blooming resistance under high temperature conditions of a vinyl chloride resin molded product obtained through molding of the vinyl chloride resin composition can be further increased when the structure of $R^4$ is as set forth above.

[$R^5$]

$R^5$ in formula (2) is a hydrocarbon group having a valence of 1 or hydrogen. The n-number of $R^5$ groups may be the same as or different from one another. Each hydrocarbon group having a valence of 1 of $R^5$ may be an aliphatic hydrocarbon group having a valence of 1 or an aromatic hydrocarbon group having a valence of 1, but is preferably an aliphatic hydrocarbon group having a valence of 1, more preferably a chain aliphatic hydrocarbon group having a valence of 1, and even more preferably a saturated chain aliphatic hydrocarbon group having a valence of 1.

The carbon number of each hydrocarbon group of $R^5$ is preferably 1 or 2, and more preferably 1.

$R^5$ may, for example, be hydrogen, a methyl group, an ethyl group, or the like.

It is preferable that at least one of the n-number of $R^5$ groups is hydrogen, and more preferable that each of the n-number of $R^5$ groups is hydrogen.

Although the reason for this is not clear, blooming resistance under high temperature conditions of a vinyl chloride resin molded product obtained through molding of the vinyl chloride resin composition can be further increased when the structure of $R^5$ is as set forth above.

[$R^6$]

$R^6$ in formula (2) is a hydrocarbon group having a valence of 1. The n-number of $R^6$ groups may be the same as or different from one another. Moreover, the n-number of $R^6$ groups may or may not include an unsaturated hydrocarbon group including at least one carbon-carbon unsaturated bond. In other words, a saturated hydrocarbon group of $R^6$ and an unsaturated hydrocarbon group of $R^6$ may both be present in a single molecule of the amide compound (d), or only saturated hydrocarbon groups of $R^6$ may be present in the amide compound (d). Although the reason for this is not clear, blooming resistance under high temperature conditions of a vinyl chloride resin molded product obtained through molding of the vinyl chloride resin composition can be further increased when the structure of $R^6$ is as set forth above.

Each saturated hydrocarbon group of $R^6$ is preferably a saturated aliphatic hydrocarbon group having a valence of 1, and more preferably a saturated chain aliphatic hydrocarbon group having a valence of 1.

The carbon number of each saturated hydrocarbon group of $R^6$ is preferably 11 or more, more preferably 13 or more, and even more preferably 15 or more, is preferably 23 or less, more preferably 21 or less, and even more preferably 19 or less, and is particularly preferably 17. Although the reason for this is not clear, blooming resistance under high temperature conditions of a vinyl chloride resin molded product obtained through molding of the vinyl chloride resin composition can be further increased when the structure of $R^6$ is as set forth above. Note that the carbon number of $R^6$ is preferably the same as the carbon number of $R^3$ in the previously described compound (c).

Each saturated hydrocarbon group of $R^6$ may, for example, be $CH_3(CH_2)_{10}$—, $CH_3(CH_2)_{12}$—, $CH_3(CH_2)_{14}$—, $CH_3(CH_2)_{16}$—, $CH_3(CH_2)_{18}$—, $CH_3(CH_2)_{20}$—, $CH_3(CH_2)_{22}$—, or the like.

Each unsaturated hydrocarbon group of $R^6$ is preferably an unsaturated aliphatic hydrocarbon group having a valence of 1, and more preferably an unsaturated chain aliphatic hydrocarbon group having a valence of 1. Moreover, each unsaturated hydrocarbon group of $R^6$ is preferably an unsaturated chain hydrocarbon group having a valence of 1.

The carbon number of each unsaturated hydrocarbon group of $R^6$ is preferably 11 or more, more preferably 13 or more, and even more preferably 15 or more, is preferably 23 or less, more preferably 21 or less, and even more preferably 19 or less, and is particularly preferably 17.

Each unsaturated hydrocarbon group of $R^6$ may, for example, be an unsaturated hydrocarbon group including one or more carbon-carbon double bonds such as a mono-unsaturated hydrocarbon group (for example, $CH_3(CH_2)_7CH=CH(CH_2)_7$— or $CH_3(CH_2)_7CH=CH(CH_2)_{11}$—), a diunsaturated hydrocarbon group (for example, $CH_3(CH_2)_4(CH=CHCH_2)_2(CH_2)_6$—), a triunsaturated hydrocarbon group (for example, $CH_3CH_2(CH=CHCH_2)_3(CH_2)_6$—), a tetraunsaturated hydrocarbon group, a pentaunsaturated hydrocarbon group, or a hexaunsaturated hydrocarbon group, or may be an unsaturated hydrocarbon group including one or more carbon-carbon triple bonds. Of these examples, each unsaturated hydrocarbon group of $R^6$ is preferably an unsaturated hydrocarbon group including one or more carbon-carbon double bonds.

Furthermore, it is preferable that at least one of the n-number of $R^6$ groups is a saturated hydrocarbon group, and more preferable that each of the n-number of $R^6$ groups is a saturated hydrocarbon group (i.e., not including unsaturated bonds). Although the reason for this is not clear, blooming resistance under high temperature conditions of a vinyl chloride resin molded product obtained through molding of the vinyl chloride resin composition can be further increased when the structure of $R^6$ is as set forth above. Of the examples set forth above, $R^6$ is preferably a saturated chain aliphatic hydrocarbon group, more preferably $CH_3(CH_2)_{10}$— or $CH_3(CH_2)_{16}$—, and even more preferably $CH_3(CH_2)_{16}$—.

When the preferable structures of $R^4$, $R^5$, and $R^6$ set forth above are taken into consideration, the amide compound (d) is preferably a saturated fatty acid amide (secondary amide of a saturated fatty acid) including n-number of amide bonds in a single molecule thereof, and more preferably a long-chain saturated fatty acid amide (secondary amide of long-chain saturated fatty acid).

Specifically, the amide compound (d) may, for example, be ethylene bislauramide, ethylene bisstearamide (particularly dimethylene bisstearamide), ethylene bispalmitamide, hexamethylene bisstearamide, or the like. Of these examples, the amide compound (d) is preferably ethylene bisstearamide or hexamethylene bisstearamide.

<<Content>>

The content of the amide compound (d) per 100 parts by mass of the previously described vinyl chloride resin (a) is preferably 0.04 parts by mass or more, more preferably 0.06 parts by mass or more, and even more preferably 0.08 parts by mass or more, and is preferably 0.4 parts by mass or less, more preferably 0.3 parts by mass or less, and even more preferably 0.2 parts by mass or less. When the content of the amide compound (d) relative to the vinyl chloride resin (a) is not more than any of the upper limits set forth above, surface lubricity of a vinyl chloride resin molded product formed using the vinyl chloride resin composition can be further improved. Moreover, when the content of the amide compound (d) relative to the vinyl chloride resin (a) is not less than any of the lower limits set forth above, blooming resistance under high temperature conditions of a vinyl chloride resin molded product formed using the vinyl chloride resin composition can be further improved.

The content of the amide compound (d) per 100 parts by mass of the previously described plasticizer (b) is preferably 0.04 parts by mass or more, more preferably 0.06 parts by mass or more, and even more preferably 0.08 parts by mass or more, and is preferably 0.4 parts by mass or less, more preferably 0.3 parts by mass or less, and even more preferably 0.2 parts by mass or less. In general, the plasticizer (b) tends to become a cause of stickiness of the surface of a vinyl chloride resin molded product, and hence a sufficiently high level of surface lubricity of a vinyl chloride resin molded product formed using the vinyl chloride resin composition can be ensured when the content of the amide compound (d) relative to the plasticizer (b) is not more than any of the upper limits set forth above. Moreover, when the content of the amide compound (d) relative to the plasticizer (b) is not less than any of the lower limits set forth above, blooming resistance under high temperature conditions of a vinyl chloride resin molded product formed using the vinyl chloride resin composition can be further improved.

The content of the amide compound (d) is preferably 0.2 or more times, more preferably 0.25 or more times, and even more preferably 0.3 or more times the content of the previously described compound (c), and is preferably 5 or less times, more preferably 2 or less times, even more preferably 1 or less times, and further preferably 0.6 or less times the content of the previously described compound (c). This is because blooming resistance under high temperature conditions of a vinyl chloride resin molded product obtained through molding of the vinyl chloride resin composition can be further increased when the content of the amide compound (d) is 0.2 or more times the content of the compound (c). Moreover, although the reason for this is not clear, a sufficiently high level of surface lubricity of a vinyl chloride resin molded product obtained through molding of the vinyl chloride resin composition can be ensured when the content of the amide compound (d) is 5 or less times the content of the compound (c).

The total content of the compound (c) and the amide compound (d) per 100 parts by mass of the previously described vinyl chloride resin (a) is preferably 0.2 parts by mass or more, more preferably 0.22 parts by mass or more, and even more preferably 0.24 parts by mass or more, and is preferably 0.6 parts by mass or less, more preferably 0.55 parts by mass or less, and even more preferably 0.5 parts by mass or less. This is because a good balance of surface lubricity and blooming resistance under high temperature conditions of a vinyl chloride resin molded product formed using the vinyl chloride resin composition can be achieved when the total content of the compound (c) and the amide compound (d) relative to the vinyl chloride resin (a) is within any of the ranges set forth above.

The total content of the compound (c) and the amide compound (d) per 100 parts by mass of the previously described plasticizer (b) is preferably 0.2 parts by mass or more, more preferably 0.22 parts by mass or more, and even more preferably 0.24 parts by mass or more, and is preferably 0.6 parts by mass or less, more preferably 0.55 parts by mass or less, and even more preferably 0.5 parts by mass or less. This is because a better balance of surface lubricity and blooming resistance under high temperature conditions of a vinyl chloride resin molded product formed using the vinyl chloride resin composition can be achieved when the total content of the compound (c) and the amide compound (d) is within any of the ranges set forth above.

<Additives>

The presently disclosed vinyl chloride resin composition may further contain various additives besides the components set forth above. Examples of additives that may be used include, but are not specifically limited to, components other than the previously described compound (c) and amide compound (d) that can function as lubricants (other lubricants); stabilizers such as perchloric acid-treated hydrotalcite, zeolites, β-diketones, and fatty acid metal salts; mold release agents; dusting agents other than the previously described vinyl chloride resin fine particles; impact modifiers; perchloric acid compounds other than perchloric acid-treated hydrotalcite (for example, sodium perchlorate and potassium perchlorate); antioxidants; fungicides; flame retardants; antistatic agents; fillers; light stabilizers; and foaming agents.

Among additives that may be contained in the presently disclosed vinyl chloride resin composition, examples of perchloric acid-treated hydrotalcite, zeolites, β-diketones, fatty acid metal salts, mold release agents, other dusting agents, impact modifiers, perchloric acid compounds other than perchloric acid-treated hydrotalcite, antioxidants, fungicides, flame retardants, antistatic agents, fillers, light stabilizers, and foaming agents that may be used include those described in WO 2016/098344 A1, for example, and suitable amounts thereof may also be the same as described.

<<Other Lubricants>>

Examples of other lubricants that may be used include, but are not specifically limited to, fatty acid amides other than the previously described compound (c) and amide compound (d), and silicone oil.

More specifically, examples of fatty acid amides other than the previously described compound (c) and amide compound (d) include saturated fatty acid amides including at least one amide bond in a molecule thereof such as lauramide and stearamide; and unsaturated fatty acid amides including only one amide bond in a molecule thereof such as oleamide and erucamide.

The silicone oil may be unmodified silicone oil, modified silicone oil, or a mixture of unmodified silicone oil and modified silicone oil.

[Content]

The content of other lubricants per 100 parts by mass of the previously described vinyl chloride resin (a) may be 0 parts by mass or more than 0 parts by mass, and is preferably 2.0 parts by mass or less, more preferably 1.0 parts by mass or less, even more preferably 0.5 parts by mass or less, and particularly preferably 0.2 parts by mass or less. Through further compounding of other lubricants in the vinyl chloride resin composition, surface lubricity and fluff adhesion resistance of a vinyl chloride resin molded product formed using the composition can be further increased. Moreover, excellent blooming resistance of a vinyl chloride resin molded product formed using the vinyl chloride resin composition can be maintained when the content of other lubricants is not more than any of the upper limits set forth above.

The content of other lubricants per 100 parts by mass of the previously described plasticizer (b) may be 0 parts by mass or more than 0 parts by mass, and is preferably 2.0 parts by mass or less, more preferably 1.0 parts by mass or less, even more preferably 0.5 parts by mass or less, and particularly preferably 0.2 parts by mass or less. In general, the plasticizer (b) tends to become a cause of stickiness of the surface of a vinyl chloride resin molded product, and hence further compounding of other lubricants in the vinyl chloride resin composition can further increase surface lubricity and fluff adhesion resistance of a vinyl chloride resin molded product formed using the composition. Moreover, excellent blooming resistance of a vinyl chloride resin molded product formed using the vinyl chloride resin composition can be maintained when the content of other lubricants is not more than any of the upper limits set forth above.

The content of other lubricants per 100 parts by mass of the previously described compound (c) may be 0 parts by mass or more than 0 parts by mass, and is preferably 100 parts by mass or less, and more preferably 67 parts by mass or less. Through further compounding of other lubricants in the vinyl chloride resin composition, surface lubricity and fluff adhesion resistance of a vinyl chloride resin molded product formed using the composition can be further increased. Moreover, excellent blooming resistance of a vinyl chloride resin molded product formed using the vinyl chloride resin composition can be maintained when the content of other lubricants is not more than any of the upper limits set forth above.

<Production Method of Vinyl Chloride Resin Composition>

The presently disclosed vinyl chloride resin composition can be produced by mixing the components described above.

Although no specific limitations are placed on the method by which the vinyl chloride resin (a), the plasticizer (b), the compound (c), and, as necessary, the amide compound (d) and/or various additives are mixed, a method in which components other than a dusting agent (inclusive of vinyl chloride resin fine particles) are mixed by dry blending and then the dusting agent is subsequently added and mixed therewith may be adopted, for example. The dry blending is preferably carried out using a Henschel mixer. Although the temperature during dry blending is not specifically limited, the temperature is preferably 50° C. or higher, and more preferably 70° C. or higher, and is preferably 200° C. or lower.

<Use of Vinyl Chloride Resin Composition>

The obtained vinyl chloride resin composition can suitably be used in powder molding, and can more suitably be used in powder slush molding.

(Vinyl Chloride Resin Molded Product)

A feature of the presently disclosed vinyl chloride resin molded product is that it is obtained by molding the vinyl chloride resin composition set forth above by any method. As a result of the presently disclosed vinyl chloride resin molded product being formed using any one of the vinyl chloride resin compositions set forth above, the presently disclosed vinyl chloride resin molded product normally contains at least a vinyl chloride resin (a), a plasticizer (b), and a compound (c) having the specific structure set forth above, and has excellent surface lubricity, blooming resistance under normal temperature (23° C.) conditions, and fluff adhesion resistance.

Therefore, the presently disclosed vinyl chloride resin molded product can suitably be used in production of a surface skin of an automobile interior component (for example, an automobile instrument panel or door trim) for which surface stickiness and blooming are favorably suppressed.

<<Formation Method of Vinyl Chloride Resin Molded Product>>

Although no specific limitations are placed on the mold temperature in powder slush molding in a situation in which the vinyl chloride resin molded product is formed by powder slush molding, the mold temperature is preferably 200° C. or higher, and more preferably 220° C. or higher, and is preferably 300° C. or lower, and more preferably 280° C. or lower.

The following method, for example, may be used in production of the vinyl chloride resin molded product without any specific limitations. In this method, the presently disclosed vinyl chloride resin composition is sprinkled onto a mold having a temperature within any of the ranges set forth above. The vinyl chloride resin composition is initially left for not less than 5 seconds and not more than 30 seconds and, after shaking off any excess vinyl chloride resin composition, is then further left for not less than 30 seconds and not more than 3 minutes at any temperature. The mold is subsequently cooled to a temperature of not lower than 10° C. and not higher than 60° C., and the presently disclosed vinyl chloride resin molded product that is obtained is removed from the mold. A sheet-like molded product that imitates the shape of the mold is obtained.

(Laminate)

The presently disclosed laminate includes a foamed polyurethane molded product and any one of the vinyl chloride resin molded products set forth above. The vinyl chloride resin molded product typically constitutes one surface of the laminate.

As a result of the presently disclosed laminate including a vinyl chloride resin molded product formed using the presently disclosed vinyl chloride resin composition, the laminate has excellent surface lubricity, blooming resistance under normal temperature (23° C.) conditions, and fluff adhesion resistance at the side corresponding to this molded product, for example. Therefore, the presently disclosed laminate can suitably be used as an automobile interior material forming an automobile interior component such as an automobile instrument panel or a door trim, for example.

The method by which the foamed polyurethane molded product and the vinyl chloride resin molded product are stacked is not specifically limited and may, for example, be a method such as described below. Specifically, (1) a method in which the foamed polyurethane molded product and the vinyl chloride resin molded product are separately prepared and are subsequently adhered to one another by thermal fusion bonding, thermal adhesion, or using a commonly known adhesive, or (2) a method in which raw materials of the foamed polyurethane molded product such as an isocyanate and a polyol are caused to react and polymerize on the vinyl chloride resin molded product while carrying out polyurethane foaming by a commonly known method to directly form the foamed polyurethane molded product on the vinyl chloride resin molded product may be adopted. The latter method (2) is more suitable because it involves a simple process and enables laminates of various different shapes to be obtained while easily achieving strong adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to measure and evaluate the low-temperature tensile characteristics, surface lubricity, blooming resistance under normal temperature conditions, and blooming resistance under high temperature conditions of a vinyl chloride resin molded product; and the fluff adhesiveness of a vinyl chloride resin molded product in a laminate.

<Low-Temperature Tensile Characteristics>

Low-temperature tensile characteristics of a vinyl chloride resin molded product were evaluated by measuring tensile elongation (%) and tensile fracture stress (MPa) for both an initial (unheated) state and a post-heating (heat aging test) state as described below.

<<Initial>>

An obtained vinyl chloride resin molded sheet was punched with a no. 1 dumbbell prescribed by JIS K6251, and then tensile elongation (%) and tensile fracture stress (MPa) at a low temperature of −35° C. were measured in accordance with JIS K7161 at a tensile rate of 200 mm/min. A larger value for tensile elongation indicates that the initial (unheated) vinyl chloride resin molded product has better low-temperature ductility.

<<Post-Heating (Heat Aging Test)>>

A laminate lined with a foamed polyurethane molded product was used as a sample. The sample was placed inside an oven and was heated in an environment having a temperature of 130° C. for 100 hours. Next, the foamed polyurethane molded product was peeled from the post-heating laminate to prepare just a vinyl chloride resin molded sheet. The tensile elongation (%) and tensile fracture stress (MPa) of the post-heating vinyl chloride resin molded sheet were measured under the same conditions as for the initial state. A larger value for tensile elongation indicates that the post-heating (heat aging test) vinyl chloride resin molded product has better low-temperature ductility.

<Surface Lubricity>

The surface lubricity of a vinyl chloride resin molded product was evaluated by measuring the coefficient of kinetic friction as described below.

Specifically, a texture tester (produced by Trinity-Lab Inc.; product name: TL201Ts) was used to measure the coefficient of kinetic friction of the surface of a vinyl chloride resin molded sheet by bringing a haptic contactor into contact with the surface of the vinyl chloride resin molded sheet under conditions of a load of 50 g, a speed of 10 mm/s, a test range of 50 mm, and a measurement range of 30 mm (excluding 10 mm at the start and the end of the test range) in a measurement environment having a temperature of 23° C. and a relative humidity of 50%. A smaller value for the coefficient of kinetic friction indicates better surface lubricity of the vinyl chloride resin molded product and better suppression of surface stickiness.

<Fluff Adhesion Resistance>

A laminate in which a vinyl chloride resin molded product was lined with a foamed polyurethane molded product was cut out with dimensions of 170 mm×300 mm to obtain a specimen. A chroma meter (produced by Konica Minolta Sensing; product name: CR-400) was used to measure lightness (pre-rubbing test L* value) at 20 arbitrary locations at the vinyl chloride resin molded product side of the specimen.

Next, the specimen for which lightness had been measured was placed on a sample platform of a Gakushin-type rubbing tester (produced by Daiei Kagaku Seiki Mfg. Co.; product name: RT-200) with the vinyl chloride resin molded product side of the specimen on top. A load of 500 g was attached to the rubbing tester such that the total load on the test specimen was 500 g (approximately 5 N). Next, a single sheet of paper towel (produced by Nippon Paper Cresia Co., Ltd.; product name: COMFORT) was attached to the tip of the rubbing tester and this attached paper towel was moved back and forth 10 times while in contact with the surface at the vinyl chloride resin molded product side of the specimen so as to rub the specimen surface and the paper towel. Lightness (post-rubbing test L* value) was measured by the same method as described above with respect to the 20 locations at which lightness had been measured in advance. An average value of the difference in lightness measured at the 20 locations before and after the rubbing test (post-rubbing test L* value−pre-rubbing test L* value) was calculated as $\Delta L^*$. A smaller value for $\Delta L^*$ indicates that the surface of the vinyl chloride resin molded product has higher fluff adhesion resistance and that it is harder for fibrous waste to adhere to the surface of the molded product.

The fluff adhesion resistance test was conducted in an environment having a temperature of 23° C. and a relative humidity of 50%.

<Blooming Resistance Under Normal Temperature Conditions>

The degree of blooming at the surface of a vinyl chloride resin molded product under normal temperature conditions was evaluated as follows.

The state of the surface of a vinyl chloride resin molded sheet (side at which a textured pattern had been imparted) was inspected by eye straight after sheet formation and 2 weeks after sheet formation. Blooming was judged to have occurred in a situation in which a section of the surface of the vinyl chloride resin molded sheet had a white powdered appearance, and blooming resistance was evaluated in accordance with the following standard.

Note that storage of the vinyl chloride resin molded sheet and confirmation of blooming were performed in an environment at normal temperature (23° C.) and 50% relative humidity.

A: No change in surface state of vinyl chloride resin molded sheet is observed between straight after sheet formation and 2 weeks after sheet formation B: Slight blooming is confirmed at surface of vinyl chloride resin molded sheet 2 weeks after sheet formation compared to straight after sheet formation C: Clear blooming is confirmed at surface of vinyl chloride resin molded sheet 2 weeks after sheet formation compared to straight after sheet formation <Blooming Resistance Under High Temperature Conditions>

The degree of blooming at the surface of a vinyl chloride resin molded product under high temperature conditions was evaluated as follows.

The state of the surface of a vinyl chloride resin molded sheet (side at which a textured pattern had been imparted) was inspected by eye straight after sheet formation and after the sheet had been stored for 500 hours under high temperature conditions (temperature of 120° C.). Blooming was judged to have occurred in a situation in which a section of the surface of the vinyl chloride resin molded sheet had a white powdered appearance, and blooming resistance under high temperature conditions was evaluated in accordance with the following standard.

A: No change in surface state of vinyl chloride resin molded sheet is observed between straight after sheet formation and after 500 hours storage under high temperature conditions B: Slight blooming is confirmed at surface of vinyl chloride resin molded sheet after 500 hours storage under high temperature conditions compared to straight after sheet formation C: Clear blooming is confirmed at surface of vinyl chloride resin molded sheet after 500 hours storage under high temperature conditions compared to straight after sheet formation <Melting Point of Just Lubricants>

Lubricants (compound (c) and/or amide compound (d)) used in each example or comparative example were mixed in a mass ratio that was the same as the mass ratio of the additive amounts thereof in the corresponding example or comparative example in order to prepare a mixture. Differential scanning calorimetry (DSC) was performed with respect to the obtained mixture to measure the melting point during a second heating process performed at a heating rate of 10° C./min in air.

Example 1-1

<Production of Vinyl Chloride Resin Composition>

With the exception of plasticizers (trimellitic acid ester and epoxidized soybean oil) and vinyl chloride resin fine particles used as a dusting agent, the ingredients indicated in Table 1 were supplied into and mixed in a Henschel mixer. The temperature of the mixture was raised to 80° C., at which point, all the plasticizers were added. The resultant mixture was then dried up by further raising the temperature thereof (i.e., the mixture changed to a dry state through absorption of the plasticizers by vinyl chloride resin particles used as a vinyl chloride resin). Thereafter, once the dried-up mixture had cooled to a temperature of 100° C. or lower, the vinyl chloride resin fine particles used as the dusting agent were added to the mixture to produce a vinyl chloride resin composition.

<Formation of Vinyl Chloride Resin Molded Product>

The vinyl chloride resin composition obtained as described above was sprinkled onto a textured mold that was heated to a temperature of 250° C. and, after being left to melt for a given time of about 8 seconds to 20 seconds, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a vinyl chloride resin molded sheet of 200 mm×300 mm×1 mm was removed from the mold as a vinyl chloride resin molded product.

The obtained vinyl chloride resin molded sheet was used to measure and evaluate initial (unheated) low-temperature tensile characteristics, surface lubricity, blooming resistance under normal temperature conditions, and blooming resistance under high temperature conditions by the previously described methods. The results are shown in Table 1.

<Formation of Laminate>

The obtained vinyl chloride resin molded sheet was placed in a 200 mm×300 mm×10 mm mold with the textured surface underneath.

A polyol mixture was separately obtained by mixing 50 parts of a propylene oxide (PO)/ethylene oxide (EO) block adduct of propylene glycol (hydroxyl value 28, terminal EO unit content 10%, internal EO unit content 4%), 50 parts of a PO/EO block adduct of glycerin (hydroxyl value 21, terminal EO unit content 14%), 2.5 parts of water, 0.2 parts of an ethylene glycol solution of triethylenediamine (produced by Tosoh Corporation; product name: TEDA-L33), 1.2 parts of triethanolamine, 0.5 parts of triethylamine, and 0.5 parts of a foam stabilizer (produced by Shin-Etsu Chemical Co., Ltd.; product name: F-122). A mixed solution was then prepared by mixing the obtained polyol mixture with polymethylene polyphenylene polyisocyanate (polymeric MDI) in a ratio determined to give an index of 98. The prepared mixed solution was poured onto the vinyl chloride resin molded sheet that had been placed in the mold as described above. Thereafter, the mold was covered with a 348 mm×255 mm×10 mm aluminum plate to seal the mold. After sealing, the mold was left for 5 minutes such that a laminate was formed in the mold. The laminate included a vinyl chloride resin molded sheet (thickness: 1 mm) serving as a surface skin that was lined with a foamed polyurethane molded product (thickness: 9 mm; density: 0.18 g/cm$^3$).

The formed laminate was removed from the mold and the vinyl chloride resin sheet of the laminate was used to measure and evaluate post-heating low-temperature tensile characteristics and fluff adhesion resistance by the previously described methods. The results are shown in Table 1.

Example 1-2

A vinyl chloride resin composition, a vinyl chloride resin molded product, and a laminate were formed in the same way as in Example 1-1 with the exception that 0.2 parts of polyether-modified silicone oil was further added as an additive (other lubricant) in production of the vinyl chloride resin composition. Addition of the polyether-modified silicone oil was performed with addition of the compound (c).

Measurements and evaluations were performed in the same way as in Example 1-1. The results are shown in Table 1.

Example 1-3

A vinyl chloride resin composition, a vinyl chloride resin molded product, and a laminate were formed in the same way as in Example 1-1 with the exception that the amount of the compound (c) was changed to 0.5 parts in production of the vinyl chloride resin composition.

Measurements and evaluations were performed in the same way as in Example 1-1. The results are shown in Table 1.

Example 1-4

A vinyl chloride resin composition, a vinyl chloride resin molded product, and a laminate were formed in the same way as in Example 1-1 with the exception that the amount of the compound (c) was changed to 1.0 parts in production of the vinyl chloride resin composition.

Measurements and evaluations were performed in the same way as in Example 1-1. The results are shown in Table 1.

Comparative Example 1-1

A vinyl chloride resin composition, a vinyl chloride resin molded product, and a laminate were formed in the same way as in Example 1-1 with the exception that a compound (c) was not used in production of the vinyl chloride resin composition.

Measurements and evaluations were performed in the same way as in Example 1-1. The results are shown in Table 1.

Comparative Example 1-2

A vinyl chloride resin composition, a vinyl chloride resin molded product, and a laminate were formed in the same way as in Example 1-1 with the exception that a compound (c) was not used and 0.5 parts of ethylene bisstearamide was added as an amide compound (d) in production of the vinyl chloride resin composition.

Measurements and evaluations other than fluff adhesion resistance were performed in the same way as in Example 1-1. The results are shown in Table 1.

Comparative Example 1-3

A vinyl chloride resin composition, a vinyl chloride resin molded product, and a laminate were formed in the same way as in Example 1-1 with the exception that a compound (c) was not used and 1.0 parts of ethylene bisstearamide was added as an amide compound (d) in production of the vinyl chloride resin composition.

Measurements and evaluations were performed in the same way as in Example 1-1. The results are shown in Table 1.

Comparative Example 1-4

A vinyl chloride resin composition, a vinyl chloride resin molded product, and a laminate were formed in the same way as in Example 1-1 with the exception that a compound (c) was not used and 0.5 parts of ethylene bislauramide was added as an amide compound (d) in production of the vinyl chloride resin composition.

Measurements and evaluations other than fluff adhesion resistance were performed in the same way as in Example 1-1. The results are shown in Table 1.

Comparative Example 1-5

A vinyl chloride resin composition, a vinyl chloride resin molded product, and a laminate were formed in the same way as in Example 1-1 with the exception that a compound (c) was not used and 1.0 parts of ethylene bislauramide was added as an amide compound (d) in production of the vinyl chloride resin composition.

Measurements and evaluations were performed in the same way as in Example 1-1. The results are shown in Table 1.

Comparative Example 1-6

A vinyl chloride resin composition, a vinyl chloride resin molded product, and a laminate were formed in the same way as in Example 1-1 with the exception that a compound (c) was not used and 0.5 parts of a saturated fatty acid amide (lauramide) including one amide bond in a molecule thereof was added as another lubricant in production of the vinyl chloride resin composition.

Measurements and evaluations were performed in the same way as in Example 1-1. The results are shown in Table 1.

Comparative Example 1-7

A vinyl chloride resin composition, a vinyl chloride resin molded product, and a laminate were formed in the same way as in Example 1-1 with the exception that a compound (c) was not used and 1.0 parts of a saturated fatty acid amide (lauramide) including one amide bond in a molecule thereof was added as another lubricant in production of the vinyl chloride resin composition.

Measurements and evaluations were performed in the same way as in Example 1-1. The results are shown in Table 1.

Comparative Example 1-8

A vinyl chloride resin composition, a vinyl chloride resin molded product, and a laminate were formed in the same way as in Example 1-1 with the exception that a compound (c) was not used and 0.5 parts of a saturated fatty acid amide (stearamide) including one amide bond in a molecule thereof was added as another lubricant in production of the vinyl chloride resin composition.

Measurements and evaluations other than fluff adhesion resistance were performed in the same way as in Example 1-1. The results are shown in Table 1.

Comparative Example 1-9

A vinyl chloride resin composition, a vinyl chloride resin molded product, and a laminate were formed in the same way as in Example 1-1 with the exception that a compound (c) was not used and 1.0 parts of a saturated fatty acid amide (stearamide) including one amide bond in a molecule thereof was added as another lubricant in production of the vinyl chloride resin composition.

Measurements and evaluations were performed in the same way as in Example 1-1. The results are shown in Table 1.

Comparative Example 1-10

A vinyl chloride resin composition, a vinyl chloride resin molded product, and a laminate were formed in the same way as in Example 1-1 with the exception that a compound (c) was not used and 0.5 parts of an unsaturated fatty acid amide (oleamide) including only one amide bond in a molecule thereof was added as another lubricant in production of the vinyl chloride resin composition.

Measurements and evaluations other than fluff adhesion resistance were performed in the same way as in Example 1-1. The results are shown in Table 1.

Comparative Example 1-11

A vinyl chloride resin composition, a vinyl chloride resin molded product, and a laminate were formed in the same way as in Example 1-1 with the exception that a compound (c) was not used and 1.0 parts of an unsaturated fatty acid amide (oleamide) including only one amide bond in a molecule thereof was added as another lubricant in production of the vinyl chloride resin composition.

Measurements and evaluations were performed in the same way as in Example 1-1. The results are shown in Table 1.

Comparative Example 1-12

A vinyl chloride resin composition, a vinyl chloride resin molded product, and a laminate were formed in the same way as in Example 1-1 with the exception that a compound (c) was not used and 0.5 parts of an unsaturated fatty acid amide (erucamide) including only one amide bond in a molecule thereof was added as another lubricant in production of the vinyl chloride resin composition.

Measurements and evaluations other than fluff adhesion resistance were performed in the same way as in Example 1-1. The results are shown in Table 1.

Comparative Example 1-13

A vinyl chloride resin composition, a vinyl chloride resin molded product, and a laminate were formed in the same way as in Example 1-1 with the exception that a compound (c) was not used and 1.0 parts of an unsaturated fatty acid amide (erucamide) including only one amide bond in a molecule thereof was added as another lubricant in production of the vinyl chloride resin composition.

Measurements and evaluations were performed in the same way as in Example 1-1. The results are shown in Table 1.

Example 2-1

<Production of Vinyl Chloride Resin Composition>

With the exception of plasticizers (trimellitic acid ester and epoxidized soybean oil) and vinyl chloride resin fine particles used as a dusting agent, the ingredients indicated in Table 2 were supplied into and mixed in a Henschel mixer. The temperature of the mixture was raised to 80° C., at which point, all the plasticizers were added. The resultant mixture was then dried up by further raising the temperature thereof (i.e., the mixture changed to a dry state through absorption of the plasticizers by vinyl chloride resin particles used as a vinyl chloride resin). Thereafter, once the dried-up mixture had cooled to a temperature of 100° C. or lower, the vinyl chloride resin fine particles used as the dusting agent were added to the mixture to produce a vinyl chloride resin composition.

When the melting point of just the lubricants was measured, a single melting point was observed at 133° C.

<Formation of Vinyl Chloride Resin Molded Product>

The vinyl chloride resin composition obtained as described above was sprinkled onto a textured mold that was heated to a temperature of 250° C. and, after being left to melt for a given time of about 8 seconds to 20 seconds, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a vinyl chloride resin molded sheet of 200 mm×300 mm×1 mm was removed from the mold as a vinyl chloride resin molded product.

The obtained vinyl chloride resin molded sheet was used to measure and evaluate initial (unheated) low-temperature tensile characteristics, surface lubricity, and blooming resistance under high temperature conditions by the previously described methods. The results are shown in Table 2.

<Formation of Laminate>

The obtained vinyl chloride resin molded sheet was placed in a 200 mm×300 mm×10 mm mold with the textured surface underneath.

A polyol mixture was separately obtained by mixing 50 parts of a propylene oxide (PO)/ethylene oxide (EO) block adduct of propylene glycol (hydroxyl value 28, terminal EO unit content 10%, internal EO unit content 4%), 50 parts of a PO/EO block adduct of glycerin (hydroxyl value 21, terminal EO unit content 14%), 2.5 parts of water, 0.2 parts of an ethylene glycol solution of triethylenediamine (produced by Tosoh Corporation; product name: TEDA-L33), 1.2 parts of triethanolamine, 0.5 parts of triethylamine, and 0.5 parts of a foam stabilizer (produced by Shin-Etsu Chemical Co., Ltd.; product name: F-122). A mixed solution was then prepared by mixing the obtained polyol mixture with polymethylene polyphenylene polyisocyanate (polymeric MDI) in a ratio determined to give an index of 98. The prepared mixed solution was poured onto the vinyl chloride resin molded sheet that had been placed in the mold as described above. Thereafter, the mold was covered with a 348 mm×255 mm×10 mm aluminum plate to seal the mold. After sealing, the mold was left for 5 minutes such that a laminate was formed in the mold. The laminate included a vinyl chloride resin molded sheet (thickness: 1 mm) serving as a surface skin that was lined with a foamed polyurethane molded product (thickness: 9 mm; density: 0.18 g/cm³).

The formed laminate was removed from the mold and the vinyl chloride resin sheet of the laminate was used to measure and evaluate post-heating low-temperature tensile characteristics by the previously described method. The results are shown in Table 2.

Example 2-2

A vinyl chloride resin composition, a vinyl chloride resin molded product, and a laminate were formed in the same way as in Example 2-1 with the exception that the amount of ethylene bisstearamide used as an amide compound (d) was changed to 0.1 parts in production of the vinyl chloride resin composition.

Measurements and evaluations were performed in the same way as in Example 2-1. The results are shown in Table 2.

When the melting point of just the lubricants was measured, a single melting point was observed at 129° C.

Example 2-3

A vinyl chloride resin composition, a vinyl chloride resin molded product, and a laminate were formed in the same way as in Example 2-1 with the exception that the amount of ethylene bisstearamide used as an amide compound (d) was changed to 0.3 parts in production of the vinyl chloride resin composition.

Measurements and evaluations were performed in the same way as in Example 2-1. The results are shown in Table 2.

When the melting point of just the lubricants was measured, a single melting point was observed at 137° C.

Example 2-4

A vinyl chloride resin composition, a vinyl chloride resin molded product, and a laminate were formed in the same way as in Example 2-1 with the exception that the amount of ethylene bisoleamide used as a compound (c) was changed to 0.2 parts and the amount of ethylene bisstearamide used as an amide compound (d) was changed to 0.1 parts in production of the vinyl chloride resin composition.

Measurements and evaluations were performed in the same way as in Example 2-1. The results are shown in Table 2.

When the melting point of just the lubricants was measured, a single melting point was observed at 128° C.

Example 2-5

A vinyl chloride resin composition, a vinyl chloride resin molded product, and a laminate were formed in the same way as in Example 2-1 with the exception that the amount of ethylene bisoleamide used as a compound (c) was changed to 0.3 parts and the amount of ethylene bisstearamide used as an amide compound (d) was changed to 0.1 parts in production of the vinyl chloride resin composition.

Measurements and evaluations were performed in the same way as in Example 2-1. The results are shown in Table 2.

When the melting point of just the lubricants was measured, a single melting point was observed at 124° C.

Example 2-6

A vinyl chloride resin composition, a vinyl chloride resin molded product, and a laminate were formed in the same way as in Example 2-1 with the exception that the amount of ethylene bisoleamide used as a compound (c) was changed to 0.3 parts in production of the vinyl chloride resin composition.

Measurements and evaluations were performed in the same way as in Example 2-1. The results are shown in Table 2.

When the melting point of just the lubricants was measured, a single melting point was observed at 128° C.

Example 2-7

A vinyl chloride resin composition, a vinyl chloride resin molded product, and a laminate were formed in the same way as in Example 2-1 with the exception that the amount of ethylene bisoleamide used as a compound (c) was changed to 0.25 parts and the amount of ethylene bisstearamide used as an amide compound (d) was changed to 0.05 parts in production of the vinyl chloride resin composition.

Measurements and evaluations were performed in the same way as in Example 2-1. The results are shown in Table 2.

When the melting point of just the lubricants was measured, a single melting point was observed at 120° C.

Example 2-8

A vinyl chloride resin composition, a vinyl chloride resin molded product, and a laminate were formed in the same way as in Example 2-1 with the exception that the amount of ethylene bisoleamide used as a compound (c) was changed to 0.05 parts and the amount of ethylene bisstearamide used as an amide compound (d) was changed to 0.25 parts in production of the vinyl chloride resin composition.

Measurements and evaluations were performed in the same way as in Example 2-1. The results are shown in Table 2.

When the melting point of just the lubricants was measured, a single melting point was observed at 142° C.

Comparative Example 2-1

A vinyl chloride resin composition, a vinyl chloride resin molded product, and a laminate were formed in the same way as in Example 2-1 with the exception that a compound (c) was not used and the amount of ethylene bisstearamide used as an amide compound (d) was changed to 0.3 parts in production of the vinyl chloride resin composition.

Measurements and evaluations were performed in the same way as in Example 2-1. The results are shown in Table 2.

The melting point of ethylene bisstearamide used as a lubricant was 144° C.

For the purpose of comparison, blooming resistance under high temperature conditions was evaluated for Example 1-1 in which an amide compound (d) was not included. The results are shown in Table 2.

The melting point of ethylene bisoleamide used as a lubricant in Example 1-1 was 117° C.

| | | Example 1-1 | Example 1-2 | Example 1-3 | Example 1-4 | Comparative Example 1-1 | Comparative Example 1-2 | Comparative Example 1-3 | Comparative Example 1-4 | Comparative Example 1-5 |
|---|---|---|---|---|---|---|---|---|---|---|
| Vinyl chloride resin composition | Vinyl chloride resin (a) | Vinyl chloride resin particles[1] [parts by mass] | 100 | 100 | 100 | 100 | 100 | 100 | 100 | 100 | 100 |
| | | Vinyl chloride resin fine particles[2] [parts by mass] | 20 | 20 | 20 | 20 | 20 | 20 | 20 | 20 | 20 |
| | Plasticizer (b) | Trimellitic acid ester[3] [parts by mass] | 110 | 110 | 110 | 110 | 110 | 110 | 110 | 110 | 110 |
| | | Epoxidized soybean oil[4] [parts by mass] | 5 | 5 | 5 | 5 | 5 | 5 | 5 | 5 | 5 |
| | Compound (c) | Ethylene bisoleamide[5] [parts by mass] | 0.3 | 0.3 | 0.5 | 1 | — | — | — | — | — |
| | Amide compound (d) | Ethylene bisstearamide[6] [parts by mass] | — | — | — | — | — | 0.5 | — | — | — |
| | | Ethylene bislauramide[7] [parts by mass] | — | — | — | — | — | — | — | 0.5 | — |
| | Additives | Other lubricants | Lauramide[8] | — | — | — | — | — | — | 1 | — | 1 |
| | | | Stearamide[9] [parts by mass] | — | — | — | — | — | — | — | — | — |
| | | | Oleamide[10] [parts by mass] | — | — | — | — | — | — | — | — | — |
| | | | Erucamide[11] [parts by mass] | — | — | — | — | — | — | — | — | — |
| | | | Polyether-modified silicone oil[12] [parts by mass] | — | 0.2 | — | — | — | — | — | — | — |
| | | Stabilizers | Perchloric acid treated-hydrotalcite[13] [parts by mass] | 4.6 | 4.6 | 4.6 | 4.6 | 4.6 | 4.6 | 4.6 | 4.6 | 4.6 |
| | | | Zeolite[14] [parts by mass] | 2.4 | 2.4 | 2.4 | 2.4 | 2.4 | 2.4 | 2.4 | 2.4 | 2.4 |
| | | | β-Diketone[15] [parts by mass] | 0.5 | 0.5 | 0.5 | 0.5 | 0.5 | 0.5 | 0.5 | 0.5 | 0.5 |
| | | | Zinc stearate[16] [parts by mass] | 0.2 | 0.2 | 0.2 | 0.2 | 0.2 | 0.2 | 0.2 | 0.2 | 0.2 |
| | | Mold release agent | 12-Hydroxystearic acid[17] [parts by mass] | 0.4 | 0.4 | 0.4 | 0.4 | 0.4 | 0.4 | 0.4 | 0.4 | 0.4 |
| | | Other additives | Carbon black pigment[18] [parts by mass] | 3.70 | 3.70 | 3.70 | 3.70 | 3.70 | 3.70 | 3.70 | 3.70 | 3.70 |
| Evaluations | Low-temperature (−35° C.) tensile characteristics | Initial | Tensile elongation [%] | 190 | 180 | 180 | 180 | 180 | 180 | 180 | 180 | 180 |
| | | | Tensile fracture stress [MPa] | 24.5 | 24.0 | 24.0 | 24.0 | 23.0 | 24.0 | 23.5 | 24.0 | 24.0 |
| | | Post-heating (130° C. × 100 hrs) | Tensile elongation [%] | 140 | 130 | 130 | 130 | 130 | 130 | 130 | 140 | 130 |
| | | | Tensile fracture stress [MPa] | 27.5 | 27.0 | 270 | 27.0 | 27.0 | 26.5 | 27.0 | 27.5 | 27.0 |

| | | | Comparative Example 1-6 | Comparative Example 1-7 | Comparative Example 1-8 | Comparative Example 1-9 | Comparative Example 1-10 | Comparative Example 1-11 | Comparative Example 1-12 | Comparative Example 1-13 |
|---|---|---|---|---|---|---|---|---|---|---|
| Surface lubricity | | Coefficient of kinetic friction (at temperature of 23° C. and relative humidity of 50%) [-] | 0.56 | 0.54 | 0.51 | 0.92 | 0.86 | 0.85 | 0.89 | 0.88 |
| Fluff adhesion resistance | | Post-rubbing test-pre-rubbing test ΔL* (at temperature of 23° C. and relative humidity of 50%; 5N × 10 rubs back and forth) [-] | 1.6 | 1.4 | 1.4 | 3.3 | Not measured | 2.9 | Not measured | 3.1 |
| Blooming resistance | | Judgment by eye at time of molding and two weeks after molding (at temperature of 23° C. and relative humidity of 50%) [-] | A | A | A | A | A | A | A | A |
| Vinyl chloride resin composition | Vinyl chloride resin (a) | Vinyl chloride resin particles[(1)] [parts by mass] | 100 | 100 | 100 | 100 | 100 | 100 | 100 | 100 |
| | | Vinyl chloride resin fine particles[(2)] [parts by mass] | 20 | 20 | 20 | 20 | 20 | 20 | 20 | 20 |
| | Plasticizer (b) | Trimellitic acid ester[(3)] [parts by mass] | 110 | 110 | 110 | 110 | 110 | 110 | 110 | 110 |
| | | Epoxidized soybean oil[(4)] [parts by mass] | 5 | 5 | 5 | 5 | 5 | 5 | 5 | 5 |
| | Compound (c) | Ethylene bisoleamide[(5)] [parts by mass] | — | — | — | — | — | — | — | — |
| | Amide compound (d) | Ethylene bisstearamide[(6)] [parts by mass] | — | — | — | — | — | — | — | — |
| | | Ethylene bislauramide[(7)] [parts by mass] | — | — | — | — | — | — | — | — |
| | Additives | Other lubricants | Lauramide[(8)] [parts by mass] | 0.5 | — | — | — | — | — | — | — |
| | | | Stearamide[(9)] [parts by mass] | — | 1 | 0.5 | — | — | — | — | — |
| | | | Oleamide[(10)] [parts by mass] | — | — | — | 1 | 0.5 | — | — | — |
| | | | Erucamide[(11)] [parts by mass] | — | — | — | — | — | 1 | 0.5 | — |
| | | | Polyether-modified silicone oil[(12)] [parts by mass] | — | — | — | — | — | — | — | 1 |

-continued

| | | 1 | 2 | 3 | 4 | 5 | 6 | 7 | 8 |
|---|---|---|---|---|---|---|---|---|---|
| Stabilizers | Perchloric acid treated-hydrotalcite(13) [parts by mass] | 4.6 | 4.6 | 4.6 | 4.6 | 4.6 | 4.6 | 4.6 | 4.6 |
| | Zeolite(14) [parts by mass] | 2.4 | 2.4 | 2.4 | 2.4 | 2.4 | 2.4 | 2.4 | 2.4 |
| | β-Diketone(15) [parts by mass] | 0.5 | 0.5 | 0.5 | 0.5 | 0.5 | 0.5 | 0.5 | 0.5 |
| | Zinc stearate(16) [parts by mass] | 0.2 | 0.2 | 0.2 | 0.2 | 0.2 | 0.2 | 0.2 | 0.2 |
| Mold release agent | 12-Hydroxystearic acid(17) [parts by mass] | 0.4 | 0.4 | 0.4 | 0.4 | 0.4 | 0.4 | 0.4 | 0.4 |
| Other additives | Carbon black pigment(18) [parts by mass] | 3.70 | 3.70 | 3.70 | 3.70 | 3.70 | 3.70 | 3.70 | 3.70 |
| Evaluations — Low-temperature (−35° C.) tensile characteristics | Initial — Tensile elongation [%] | 190 | 180 | 180 | 180 | 180 | 180 | 170 | 180 |
| | Initial — Tensile fracture stress [MPa] | 24.5 | 24.0 | 24.5 | 24.0 | 24.0 | 24.5 | 23.5 | 24.0 |
| | Post-heating (130° C. × 100 hrs) — Tensile elongation [%] | 130 | 120 | 130 | 130 | 130 | 130 | 130 | 130 |
| | Post-heating (130° C. × 100 hrs) — Tensile fracture stress [MPa] | 26.5 | 26.0 | 26.0 | 26.5 | 26.0 | 26.0 | 26.5 | 26.5 |
| Surface lubricity | Coefficient of kinetic friction (at temperature of 23° C. and relative humidity of 50%) [-] | 0.84 | 0.75 | 0.84 | 0.82 | 0.83 | 0.82 | 0.50 | 0.40 |
| Fluff adhesion resistance | Post-rubbing test-pre-rubbing test ΔL* (at temperature of 23° C. and relative humidity of 50%; 5N × 10 rubs back and forth) [-] | 2.8 | 2.4 | Not measured | 2.8 | Not measured | 2.9 | Not measured | 1.2 |
| Blooming resistance | Judgment by eye at time of molding and two weeks after molding (at temperature of 23° C. and relative humidity of 50%) | B | C | C | C | A | A | C | C |

TABLE 2

| | | | Example 2-1 | Example 2-2 | Example 2-3 | Example 2-4 | Example 2-5 |
|---|---|---|---|---|---|---|---|
| Vinyl chloride resin composition | Vinyl chloride resin (a) | Vinyl chloride resin particles[(1)] [parts by mass] | 100 | 100 | 100 | 100 | 100 |
| | | Vinyl chloride resin fine particles[(2)] [parts by mass] | 20 | 20 | 20 | 20 | 20 |
| | Plasticizer (b) | Trimellitic acid ester[(3)] [parts by mass] | 110 | 110 | 110 | 110 | 110 |
| | | Epoxidized soybean oil[(4)] [parts by mass] | 5 | 5 | 5 | 5 | 5 |
| | Compound (c) | Ethylene bisoleamide[(5)] [parts by mass] (melting point: 117° C.) | 0.15 | 0.15 | 0.15 | 0.2 | 0.3 |
| | Amide compound (d) | Ethylene bisstearamide[(6)] [parts by mass] (melting point: 144° C.) | 0.15 | 0.1 | 0.3 | 0.1 | 0.1 |
| | Ratio of content of amide compound (d) relative to content of compound (c) (content of amide compound (d)/content of compound (c)) | | 1 | 0.67 | 2 | 0.5 | 0.33 |
| | Additives | Stabilizers | Perchloric acid treated-hydrotalcite[(13)] [parts by mass] | 4.6 | 4.6 | 4.6 | 4.6 | 4.6 |
| | | | Zeolite[(14)] [parts by mass] | 2.4 | 2.4 | 2.4 | 2.4 | 2.4 |
| | | | β-Diketone[(15)] [parts by mass] | 0.5 | 0.5 | 0.5 | 0.5 | 0.5 |
| | | | Zinc stearate[(16)] [parts by mass] | 0.2 | 0.2 | 0.2 | 0.2 | 0.2 |
| | | Mold release agent | 12-Hydroxystearic acid[(17)] [parts by mass] | 0.4 | 0.4 | 0.4 | 0.4 | 0.4 |
| | | Other additives | Carbon black pigment[(18)] [parts by mass] | 3.70 | 3.70 | 3.70 | 3.70 | 3.70 |
| Evaluations | Low-temperature (−35° C.) tensile characteristics | Initial | Tensile elongation [%] | 180 | 180 | 180 | 180 | 180 |
| | | | Tensile fracture stress [MPa] | 24.5 | 24.0 | 24.0 | 24.0 | 24.5 |
| | | Post-heating (130° C. × 100 hrs) | Tensile elongation [%] | 140 | 130 | 130 | 130 | 130 |
| | | | Tensile fracture stress [MPa] | 27.0 | 27.0 | 27.0 | 27.0 | 27.0 |
| | Surface lubricity | Coefficient of kinetic friction (at temperature of 23° C. and relative humidity of 50%) [-] | | 0.60 | 0.60 | 0.67 | 0.51 | 0.51 |
| | Melting point of just lubricant(s) | DSC measurement (in air; heating rate: 10° C./min; measured during second heating process) [° C.] | | 133 | 129 | 137 | 128 | 124 |
| | Blooming resistance under high temperature conditions | Judgement by eye at time of molding and after 500 hrs storage under high temperature conditions (120° C.) | | A | A | A | A | A |

| | | | Example 2-6 | Example 2-7 | Example 2-8 | Comparative Example 2-1 | Example 1-1 |
|---|---|---|---|---|---|---|---|
| Vinyl chloride resin composition | Vinyl chloride resin (a) | Vinyl chloride resin particles[(1)] [parts by mass] | 100 | 100 | 100 | 100 | 100 |
| | | Vinyl chloride resin fine particles[(2)] [parts by mass] | 20 | 20 | 20 | 20 | 20 |
| | Plasticizer (b) | Trimellitic acid ester[(3)] [parts by mass] | 110 | 110 | 110 | 110 | 110 |
| | | Epoxidized soybean oil[(4)] [parts by mass] | 5 | 5 | 5 | 5 | 5 |
| | Compound (c) | Ethylene bisoleamide[(5)] [parts by mass] (melting point: 117° C.) | 0.3 | 0.25 | 0.05 | — | 0.3 |

TABLE 2-continued

| | | | | | | | |
|---|---|---|---|---|---|---|---|
| | Amide compound (d) | Ethylene bisstearamide[6] [parts by mass] (melting point: 144° C.) | 0.15 | 0.05 | 0.25 | 0.3 | — |
| | Ratio of content of amide compound (d) relative to content of compound (c) (content of amide compound (d)/ content of compound (c)) | | 0.5 | 0.2 | 5 | — | — |
| Additives | Stabilizers | Perchloric acid treated-hydrotalcite[13] [parts by mass] | 4.6 | 4.6 | 4.6 | 4.6 | 4.6 |
| | | Zeolite[14] [parts by mass] | 2.4 | 2.4 | 2.4 | 2.4 | 2.4 |
| | | β-Diketone[15] [parts by mass] | 0.5 | 0.5 | 0.5 | 0.5 | 0.5 |
| | | Zinc stearate[16] [parts by mass] | 0.2 | 0.2 | 0.2 | 0.2 | 0.2 |
| | Mold release agent | 12-Hydroxystearic acid[17] [parts by mass] | 0.4 | 0.4 | 0.4 | 0.4 | 0.4 |
| | Other additives | Carbon black pigment[18] [parts by mass] | 3.70 | 3.70 | 3.70 | 3.70 | 3.70 |
| Evaluations | Low-temperature (−35° C.) tensile characteristics | Initial Tensile elongation [%] | 180 | 190 | 190 | 180 | 190 |
| | | Initial Tensile fracture stress [MPa] | 24.0 | 25.0 | 24.5 | 23.0 | 24.5 |
| | | Post-heating (130° C. × 100 hrs) Tensile elongation [%] | 130 | 130 | 130 | 130 | 140 |
| | | Post-heating (130° C. × 100 hrs) Tensile fracture stress [MPa] | 27.0 | 27.5 | 27.5 | 27.0 | 27.5 |
| | Surface lubricity | Coefficient of kinetic friction (at temperature of 23° C. and relative humidity of 50%) [-] | 0.53 | 0.53 | 0.73 | 0.92 | 0.56 |
| | Melting point of just lubricant(s) | DSC measurement (in air; heating rate: 10° C./min; measured during second heating process) [° C.] | 128 | 120 | 142 | 144 | 117 |
| | Blooming resistance under high temperature conditions | Judgement by eye at time of molding and after 500 hrs storage under high temperature conditions (120° C.) | A | B | A | A | C |

(1) ZEST® (ZEST is a registered trademark in Japan, other countries, or both) 1700ZI (product name) produced by Shin Dai-ichi Vinyl Corporation (produced by suspension polymerization; average degree of polymerization: 1,700; average particle diameter: 130 μm)

(2) ZEST PQLTX (product name) produced by Shin Dai-ichi Vinyl Corporation (produced by emulsion polymerization; average degree of polymerization: 800; average particle diameter: 1.8 μm)

(3) TRIMEX N-08 (product name) produced by Kao Corporation (4) ADK CIZER O-130S (product name) produced by ADEKA Corporation (5) SLIPACKS® (SLIPACKS is a registered trademark in Japan, other countries, or both) O (product name) produced by Nippon Kasei Chemical Co., Ltd.

(6) SLIPACKS E (product name) produced by Nippon Kasei Chemical Co., Ltd.

(7) SLIPACKS L (product name) produced by Nippon Kasei Chemical Co., Ltd.

(8) DIAMID® (DIAMID is a registered trademark in Japan, other countries, or both) Y (product name) produced by Nippon Kasei Chemical Co., Ltd.

(9) AMIDE® (AMIDE is a registered trademark in Japan, other countries, or both) AP-1 (product name) produced by Nippon Kasei Chemical Co., Ltd.

(10) DIAMID O-200 (product name) produced by Nippon Kasei Chemical Co., Ltd.

(11) DIAMID L-200 (product name) produced by Nippon Kasei Chemical Co., Ltd.

(12) X-50-1039A (product name) produced by Shin-Etsu Chemical Co., Ltd. (polyether-modified silicone oil)

(13) ALCAMIZER® (ALCAMIZER is registered trademark in Japan, other countries, or both) 5 (product name) produced by Kyowa Chemical Industry Co., Ltd.

(14) MIZUKALIZER DS (product name) produced by Mizusawa Industrial Chemicals, Ltd.

(15) Karenz DK-1 (product name) produced by Showa Denko K.K.

(16) SAKAI SZ2000 (product name) produced by Sakai Chemical Industry Co., Ltd.

(17) ADK STAB LS-12 (product name) produced by ADEKA Corporation

(18) DA PX 1720(A) Black (product name) produced by Dainichiseika Color and Chemicals Mfg. Co., Ltd.

It can be seen from Table 1 that in Examples 1-1 to 1-4 in which a compound (c) having a specific structure was used, a balance of good surface lubricity and blooming resistance under normal temperature (23° C.) conditions of a vinyl chloride resin molded product was achieved compared to in Comparative Examples 1-1 to 1-13 in which such a compound (c) was not used.

Moreover, it can be seen from Table 2 that in Examples 2-1 to 2-8 in which a compound (c) having a specific structure and an amide compound (d) having a higher melting point than the compound (c) were used in combination, a balance of good surface lubricity and blooming resistance under high temperature conditions of a vinyl chloride resin molded product was achieved. In particular, it can be seen that blooming resistance under high temperature conditions of a vinyl chloride resin molded product improved in Examples 2-1 to 2-8 in which the compound (c) and the amide compound (d) were used in combination compared to in Example 1-1 in which an amide compound (d) was not used. On the other hand, it can be seen that although blooming resistance under high temperature conditions was good in Comparative Example 2-1 in which a compound (c) was not used, surface lubricity of a vinyl chloride resin molded product was inferior.

INDUSTRIAL APPLICABILITY

According to the present disclosure, it is possible to provide a vinyl chloride resin composition that enables production of a vinyl chloride resin molded product that can have a balance of excellent surface lubricity and excellent blooming resistance under normal temperature (23° C.) conditions.

Moreover, according to the present disclosure, it is possible to provide a vinyl chloride resin molded product and a laminate that can have a balance of excellent surface lubricity and excellent blooming resistance under normal temperature (23° C.) conditions.

The invention claimed is:

1. A vinyl chloride resin molded product obtained through molding of a vinyl chloride resin composition comprising:
   a vinyl chloride resin (a);
   a plasticizer (b);
   an amide compound (c) indicated by formula (1), shown below, $$R^1(NR^2COR^3)_n \quad (1)$$

where, in formula (1), n is an integer of not less than 2 and not more than 6, $R^1$ is a hydrocarbon group having a carbon number of from 1 to 8, $R^2$ is hydrogen or a hydrocarbon group having a carbon number of from 1 to 2, and $R^3$ is an unsaturated hydrocarbon group having a carbon number of from 11 to 23 and including at least one carbon-carbon unsaturated bond; and
      an amide compound (d) indicated by formula (2), shown below, $$R^4(NR^5COR^6)_n \quad (2)$$

where, in formula (2), n is an integer of not less than 2 and not more than 6, $R^4$ is a hydrocarbon group having a carbon number of from 1 to 8, $R^5$ is hydrogen or a hydrocarbon group having a carbon number of from 1 or 2, and $R^6$ is a saturated hydrocarbon group having a carbon number of from 11 to 23;
      wherein the amide compound (d) has a higher melting point than the amide compound (c) such that a mixture of the amide compounds (c) and (d) has a single melting point of not lower than 124° C. and not higher than 142° C.,
      wherein content of the plasticizer (b) is not less than 10 parts by mass and not more than 200 parts by mass per 100 parts by mass of the vinyl chloride resin (a),
      content of the compound (c) is not less than 0.04 parts by mass and not more than 2.0 parts by mass per 100 parts by mass of the vinyl chloride resin (a),
      content of the amide compound (d) is not less than 0.04 parts by mass and not more than 0.4 parts by mass per 100 parts by mass of the vinyl chloride resin (a),
      wherein the vinyl chloride resin molded product shows no change in surface state after 500 hours storage at a temperature of 120° C.

2. The vinyl chloride resin molded product according to claim 1, wherein the number of carbon-carbon unsaturated bonds in the unsaturated hydrocarbon group of $R^3$ is not less than 1 and not more than 4.

3. The vinyl chloride resin molded product according to claim 1, wherein $R^2$ is hydrogen.

4. The vinyl chloride resin molded product according to claim 1, wherein content of the amide compound (d) is not less than 0.2 times and not more than 5 times content of the amide compound (c).

5. The vinyl chloride resin molded product according to claim 1 obtained by powder molding.

6. The vinyl chloride resin molded product according to claim 5 obtained by powder slush molding.

7. The vinyl chloride resin molded product according to claim 1 used for a surface skin of an automobile interior component.

8. A laminate comprising:
   a foamed polyurethane molded product; and
   the vinyl chloride resin molded product according to claim 1.

* * * * *